US011641230B2

(12) United States Patent
Cox et al.

(10) Patent No.: US 11,641,230 B2
(45) Date of Patent: May 2, 2023

(54) SINGLE-CHANNEL, FULL-TIME FULL-DUPLEX WIRELESS SIGNAL TRANSMISSION SYSTEM

(71) Applicant: Photonic Systems, Inc., Billerica, MA (US)

(72) Inventors: Charles H. Cox, Carlisle, MA (US); Thomas Hamilton Warner, Bedford, MA (US)

(73) Assignee: Photonic Systems, Inc., Billerica, MA (US)

( * ) Notice: Subject to any disclaimer, the term of this patent is extended or adjusted under 35 U.S.C. 154(b) by 141 days.

(21) Appl. No.: 16/136,666

(22) Filed: Sep. 20, 2018

(65) Prior Publication Data

US 2019/0097707 A1  Mar. 28, 2019

Related U.S. Application Data

(60) Provisional application No. 62/563,613, filed on Sep. 26, 2017.

(51) Int. Cl.
*H04L 12/28* (2006.01)
*H04B 7/06* (2006.01)
(Continued)

(52) U.S. Cl.
CPC .......... *H04B 7/0626* (2013.01); *H04B 1/005* (2013.01); *H04L 5/0053* (2013.01); *H04L 5/14* (2013.01);
(Continued)

(58) Field of Classification Search
CPC .......... H04B 1/005; H04B 1/006; H04B 1/48; H04B 1/56; H04B 1/123; H04B 1/525;
(Continued)

(56) References Cited

U.S. PATENT DOCUMENTS 6,704,349 B1 * 3/2004 Masenten ............. H04B 1/123
375/219
7,155,128 B2  12/2006 Roberts et al.
(Continued)

FOREIGN PATENT DOCUMENTS

EP         3688877 A1   8/2020
WO    2005-104389 A1  11/2005
WO    2019/067294 A1   4/2019

OTHER PUBLICATIONS

"Notification of Transmittal of the International Searching Report and the Written Opinion of the International Searching Authority, or the Declaration" for International Patent Application No. PCT/US2018/051913, dated Feb. 20, 2019, 11 pages, International Searching Authority/Korean Intellectual Property Office, Daejeon, Republic of Korea.
(Continued)

*Primary Examiner* — John Pezzlo
(74) *Attorney, Agent, or Firm* — Rauschenbach Patent Law, PLLC; Kurt Rauschenbach

(57) ABSTRACT

A wireless single-frequency-channel, full-duplex, full-time transmit and receive communication node includes an antenna that transmits a transmit signal over a wireless transmit channel and that receives a receive signal over a wireless receive channel. A communications processor includes a first port electrically coupled to the antenna and a second port electrically coupled to a transmit path where the transmit path connects the second port to the first port. A third port of communications processor is electrically coupled to a receive path that connects the first port to the third port. The communications processor is configured to pass the transmit signal in the transmit path to the first port and configured to pass the receive signal in the receive path from the first port to the third port such that the transmit
(Continued)

signal and the receive signal occupy a same frequency channel and operate simultaneously in a same time slot.

35 Claims, 12 Drawing Sheets

(51) Int. Cl.
    *H04L 5/14*         (2006.01)
    *H04W 72/0446*    (2023.01)
    *H04L 5/00*         (2006.01)
    *H04B 1/00*         (2006.01)
    *H03J 1/16*         (2006.01)
    *H04B 7/0413*     (2017.01)

(52) U.S. Cl.
    CPC ....... *H04W 72/0446* (2013.01); *H04B 7/0413* (2013.01)

(58) Field of Classification Search
    CPC ...... H04B 3/36; H04B 7/0413; H04B 7/0626; H04B 7/0868; G01S 7/023; G01S 7/034; G01S 7/038; G01S 19/35; H04L 1/0026; H04L 1/053; H04L 5/14; H04L 5/16; H04L 5/0035; H04L 5/0053; H04L 5/1415; H04L 5/1423; H04L 5/1438; H04L 5/1461; H04W 72/085; H04W 72/0446; H04W 72/0453; H04W 84/06; H04W 84/042; H04W 88/02; H04W 88/06
    USPC .......................... 370/252, 276, 329, 430, 442
    See application file for complete search history.

(56) References Cited

U.S. PATENT DOCUMENTS

| | | | |
|---|---|---|---|
| 7,555,219 B2 | 6/2009 | Cox et al. | |
| 8,433,163 B2 | 5/2013 | Cox et al. | |
| 9,209,840 B2 | 12/2015 | Cox | |
| 9,820,311 B2* | 11/2017 | Khandani | H04B 1/525 |
| 9,935,680 B2 | 4/2018 | Cox et al. | |
| 10,374,656 B2 | 8/2019 | Cox et al. | |
| 2002/0032004 A1 | 3/2002 | Widrow | |
| 2002/0132579 A1* | 9/2002 | Hart | H04B 7/1855 |
| | | | 455/12.1 |
| 2011/0134848 A1* | 6/2011 | Tamaki | H04W 28/22 |
| | | | 370/328 |
| 2013/0050012 A1 | 2/2013 | Jungmaier et al. | |
| 2013/0089009 A1* | 4/2013 | Li | H04L 25/03305 |
| | | | 370/278 |
| 2013/0170468 A1* | 7/2013 | Baker | H04W 72/085 |
| | | | 370/330 |
| 2014/0128008 A1* | 5/2014 | Cox | H04B 1/48 |
| | | | 455/78 |
| 2016/0315749 A1* | 10/2016 | Liang | H04W 72/0453 |
| 2017/0099658 A1* | 4/2017 | Shattil | H04L 63/061 |
| 2017/0353210 A1* | 12/2017 | Pratt | H04B 7/0617 |
| 2019/0238283 A1* | 8/2019 | Liu | H04L 5/005 |

OTHER PUBLICATIONS

U S. U.S. Appl. No. 14/417,122, entitled "Same-Aperture Any-Frequency Simultaneous Transmit and Receive Communication System"; filed Jan. 23, 2015, USPTO.

E. Björnson, E. Larsson and T. Marzetta, "Massive MIMO: Ten Myths and One Critical Question", arXiv:1503.06854v2 [cS.IT] Aug. 18, 2015.

"Notification Concerning Transmittal of International Preliminary Report on Patentability (Chapter I of the Patent Cooperation Treaty" for International Patent Application No. PCT/US2018/051913, dated Apr. 9, 2020, 8 pagesThe International Bureau of WIPO, Geneva, Switzerland.

"Extended European Search Report" for European Patent Application No. 18860780.8, dated Jan. 18, 2021, 8 pages, European Patent Office, Munich, Germany.

\* cited by examiner

SINGLE-CHANNEL, FULL-TIME FULL-DUPLEX WIRELESS SIGNAL TRANSMISSION SYSTEM

CROSS REFERENCE TO RELATED APPLICATIONS

The present application is a non-provisional application of U.S. Provisional Patent Application No. 62/563,613, entitled "Single-Channel, Full-Duplex Wireless Signal Transmission System" filed on Sep. 26, 2017. The entire contents of U.S. Provisional Patent Application No. 62/563,613 are herein incorporated by reference.

The section headings used herein are for organizational purposes only and should not to be construed as limiting the subject matter described in the present application in any way.

INTRODUCTION

The increasing use of wireless systems has dramatically increased demand for electromagnetic spectrum bandwidth, which is basically a fixed resource on which wireless depends. One direct way to meet the increased demand is to utilize additional spectrum bandwidth. However, bandwidth in the electromagnetic spectrum that can be used for communications is a finite resource. The increased demand for this fixed resource, by the law of supply and demand, has pushed the cost of spectrum bandwidth to the point that there is a need to consider alternatives. One alternative is to use technology that can increase the information carrying capacity of the existing spectrum. For example, this includes technology for transmitters, receivers and links that are able to provide and support more information in a reduced spectrum bandwidth.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1A:
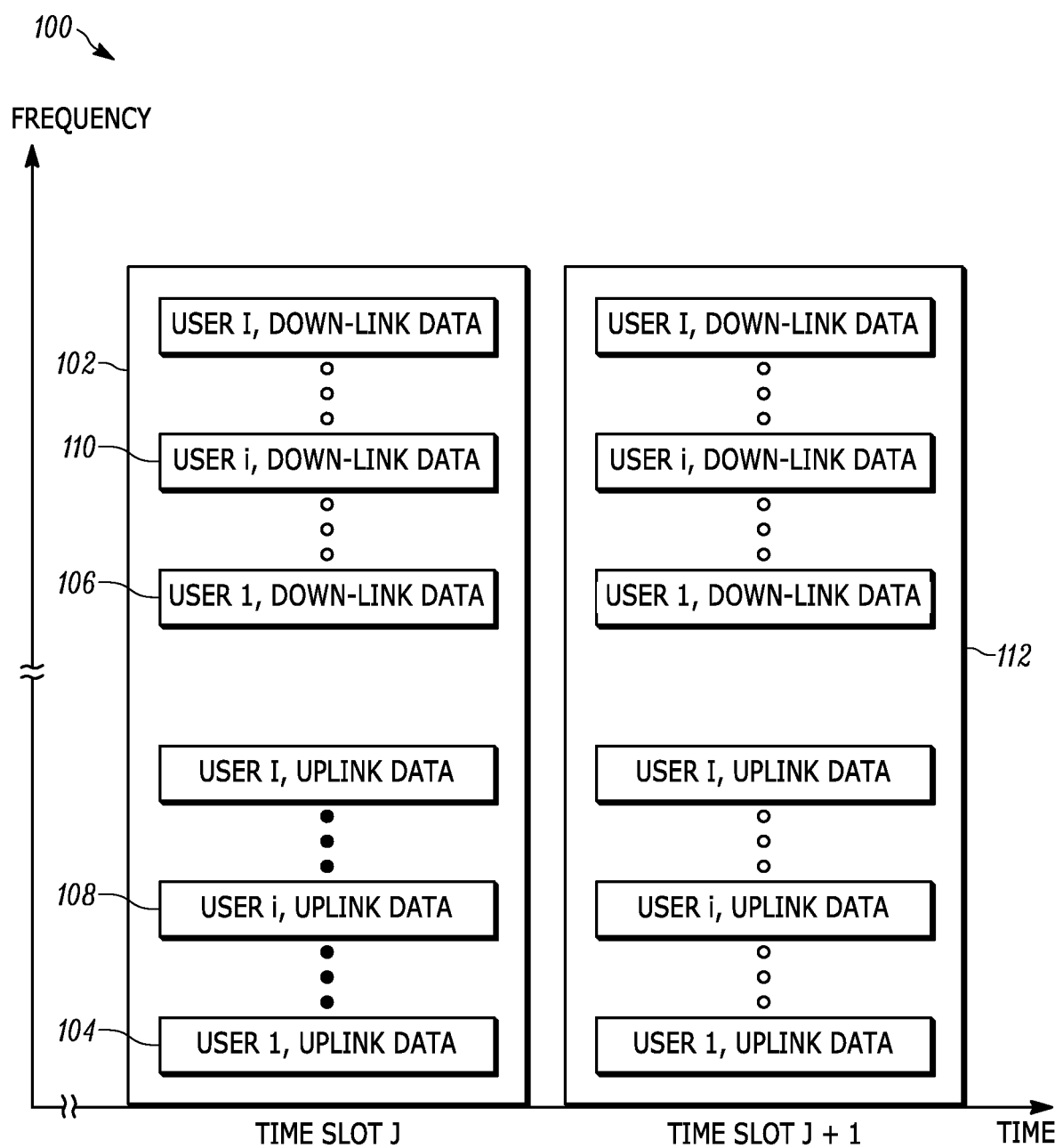
FIG. 1A illustrates a plot of frequency versus time for a known frequency division duplexing (FDD) system.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Wireless systems often need the ability to both send and receive data. Such a capability is referred to as full duplex. Prior art wireless systems utilize two signaling formats for achieving full duplex operation. The first is frequency division duplexing (FDD), which uses two frequency channels that occupy different frequency channel bandwidths in the electromagnetic spectrum. One channel is used for transmitting and one channel is used for receiving. These two different frequency channel bands occupy disjoint parts of the electromagnetic spectrum. To separate these disjoint frequency bands requires some form of tunable, frequency selective hardware, such as bandpass filters and/or frequency duplexers or diplexers. Frequency division duplexing has a number of well-known practical advantages and approximately 80% of commercial wireless cellular communications systems use this form of duplexing today.

A second signaling format for achieving full duplex communication is time division duplexing (TDD). In TDD, the transmitter and receiver may be operating on the same frequency channel, and that frequency channel is divided into time slots. Since there are typically many channels—and hence many users—within a band, each particular user requires some form of tunable, frequency selective hardware, such as bandpass filters and/or frequency duplexers or diplexers. Some time slots are reserved for transmitting and other disjoint time slots are used for receiving. The user is typically unaware of the switching between the time slots because the rate of switching between transmitting and receiving time slots is sufficiently fast. Although TDD is not currently as widely used as FDD, the fact that TDD uses a single frequency channel may prove to be a key advantage in future systems as spectrum becomes more and more precious. For example, with the decreasing availability of spectrum, it is becoming increasingly difficult to find the paired frequency bands that are necessary to support FDD. Paired frequency bands are required to support one frequency channel for an uplink and a second frequency channel for a downlink, or alternatively to support one frequency channel for transmit and a second channel for receive.

A frequency channel is a particular frequency band, typically having a narrow bandwidth of frequencies that is associated with a particular channel for signaling in a wireless system. Specific transmitters and receivers in wireless systems are typically set to operate with assigned frequency channels. Those transmitters and receivers will then operate with a frequency that falls within the assigned channel bandwidth of the frequency channel. Thus, transmitters and receivers assigned to the same channel will have nominally the same frequency of operation. In particular, there will be significant overlap in their frequency of operation to cause substantial interference with each other if prior art systems are used for the transmission and reception when they are operated simultaneously in time. This renders prior art systems unable to provide a single continuous, simultaneous link for a single user's up and down link that occupies the same frequency channel.

In general, front end systems are unable to simultaneously accept both a high-power transmit signal and a receive signal, which may be of the same order of magnitude in power as the transmit signal or a much lower order of magnitude power, at an input port if the transmit and receive signals occupy the same frequency channel. This is because there is no way to eliminate the high power transmit signal from the receive signal. For example, filters cannot be used. Consequently, prior art systems are unable to provide the continuous, simultaneous link on a same frequency channel for uplink and downlink. In some cases, such as TDD, different time slots are used for transmit and receive signals, so they do not appear at the same time at a port.

An important trend in wireless systems is utilizing the spatial multiplexing ability of Massive Multiple-Input and Multiple-Output (MIMO) as a technology means for increasing downlink, i.e. base station to mobile user, capacity on existing spectrum for cellular systems. One key challenge for these systems is that massive MIMO requires detailed information on the downlink channel. In TDD systems, this information can be obtained by measuring the uplink and then relying on channel reciprocity between the up- and down-links since with TDD, up- and down-links are on the same frequency channel. For FDD, utilizing the spatial multiplexing ability of MIMO is more challenging.

Specifically, the operation of any MIMO system relies on having accurate and up-to-date information on the state of the channel between the transmit and receive terminals for which wireless operation is desired. This information describes how a signal propagates from a transmitter to a receiver. The information includes the state of the channel as affected, for example, by reflections, scattering, fading, and power decay with distance. Having this information makes it possible to adapt transmissions to current channel conditions, which is crucial for achieving reliable communication, especially for high data rates and/or multi-antenna systems.

This wireless channel state information (CSI) is location, frequency and time dependent. Hence, in a cellular system, a time division duplex (TDD) format has been found to be a convenient way to implement a massive MIMO capability. This is because by using one frequency, TDD eliminates one of the key variables in determining the CSI. Given both that the base station is located at a fixed location, and that a mobile user takes a finite amount of time to change location, the primary CSI variables are nominally fixed for a time during which the user and other channel variables remain essentially constant. This time is sometimes referred to as the coherence time. As such, some of the TDD time slots can be used to send a pilot signal from a user up to the base station that is servicing that user. Since the CSI is reciprocal over the coherence time, the base station can use the CSI that was measured on the up-link as the CSI for the down-link to send information data back down to the mobile user.

Frequency division duplex (FDD) is the more commonly used format for applications like cellular telephony. But since FDD uses different frequencies for the up- and down-links, channel reciprocity cannot be assumed. There have been attempts to establish conditions under which the FDD down-link CSI could be estimated from measurements of the FDD up-link CSI. For example, by assuming that the channels have only a few multi-paths and/or that low frequencies are being used for the FDD channels, engineers have attempted to estimate a down-link CSI from measurements of an up-link CSI. There are concerns that these conditions are not valid, and that the estimates are not sufficient. Furthermore, these conditions are limited, and they would only enable massive MIMO using conventional FDD in a limited number of cases. As such, it is widely considered by those familiar with the state-of-the art that FDD is not compatible with massive MIMO. In other words, it is currently understood that providing continuous communication operation between the transmitter and receiver, with no time slot multiplexing, is not possible in a massive MIMO system. In addition, it is not generally possible to apply the CSI measured for one frequency channel as the basis for transmission on another channel at a different frequency.

It is highly desirable to have a duplexing method which operates continuously, like FDD, but that has both transmit and receive links on the same frequency channel, like TDD. In other words, what is currently desired in the industry is a system for which the transmit and receive links operate on the same frequency channel, but with no need to use the time slot multiplexing of TDD.

One feature of the present teaching is a generally-applicable multiplexing method that enables continuous, full-duplex operation between the transmitter and the receiver where each of the transmitter and the receiver occupy the same single-frequency channel. Such a duplexing method, enables continuous, simultaneous transmit receive link operation using unpaired spectrum and/or can be used to support massive MIMO operation.

For specificity, the following descriptions are applied to a cellular communications system. However, is should be understood that extensions to numerous other wireless communications systems will be clear to those familiar with the art. Examples of such wireless systems include WiFi, Bluetooth, radios, satellite, microwave, and others.

Cellular systems utilize base stations, each of which serves multiple mobile users. Two main types of wireless communications multiplexing schemes are employed in cellular systems, FDD and TDD. As is evident from the use of the term "division" in each of these multiplexing means, it has been the universal assumption that to provide full-duplex operation one needs to divide up either frequency or time. However, recently technology has been developed that breaks through this assumption. See, for example, U.S. patent application Ser. No. 14/417,122 and U.S. Pat. No. 9,935,680, both entitled "Same-Aperture Any-Frequency Simultaneous Transmit and Receive Communication System", which is incorporated herein by reference. This recent work has shown that it is indeed possible to simultaneously transmit and receive on the same frequency channel. Applying these new techniques enables the use of a single frequency channel that can support continuous full-duplex operation.

FIG. 1A illustrates a plot 100 of frequency versus time for a known frequency division duplexing (FDD) system. During a block 102 that lasts a time associated with time slot j, a user 1 sends uplink information in a resource block 104 that occupies one frequency channel for the duration of the time slot j. During the same time slot j associated with block 102, user 1 receives downlink information in a resource block 106 that occupies a second frequency channel for the duration of the time slot j. The frequency channels occupied by uplink information resource block 104 and downlink information resource block 106 are different and are located in nominally disjoint frequency bands of the electromagnetic spectrum. These uplink and downlink signals do operate during the same time slot, time slot j. In this way, using disjoint channel frequencies that are not the same, information is transmitted simultaneously on the uplink and on the downlink. The FDD system also supports multiple users during the same time slot j. For example, user i sends uplink information in resource block 108 on a frequency channel that is disjoint from the frequency channel that user i receives downlink information in resource block 110. Thus, the frequency channels for different users of uplink and downlink information being sent simultaneously are all disjoint. Over time, the time slots change, for example, time slot j+1 for block 112 occurs at a later time than time slot j for block 102. In all time slots, information is flowing on an uplink wireless channel and a downlink wireless channel simultaneously because the transmitters and receivers operate on nominally disjoint bandwidths in the electromagnetic frequency spectrum.

Figure 1B:
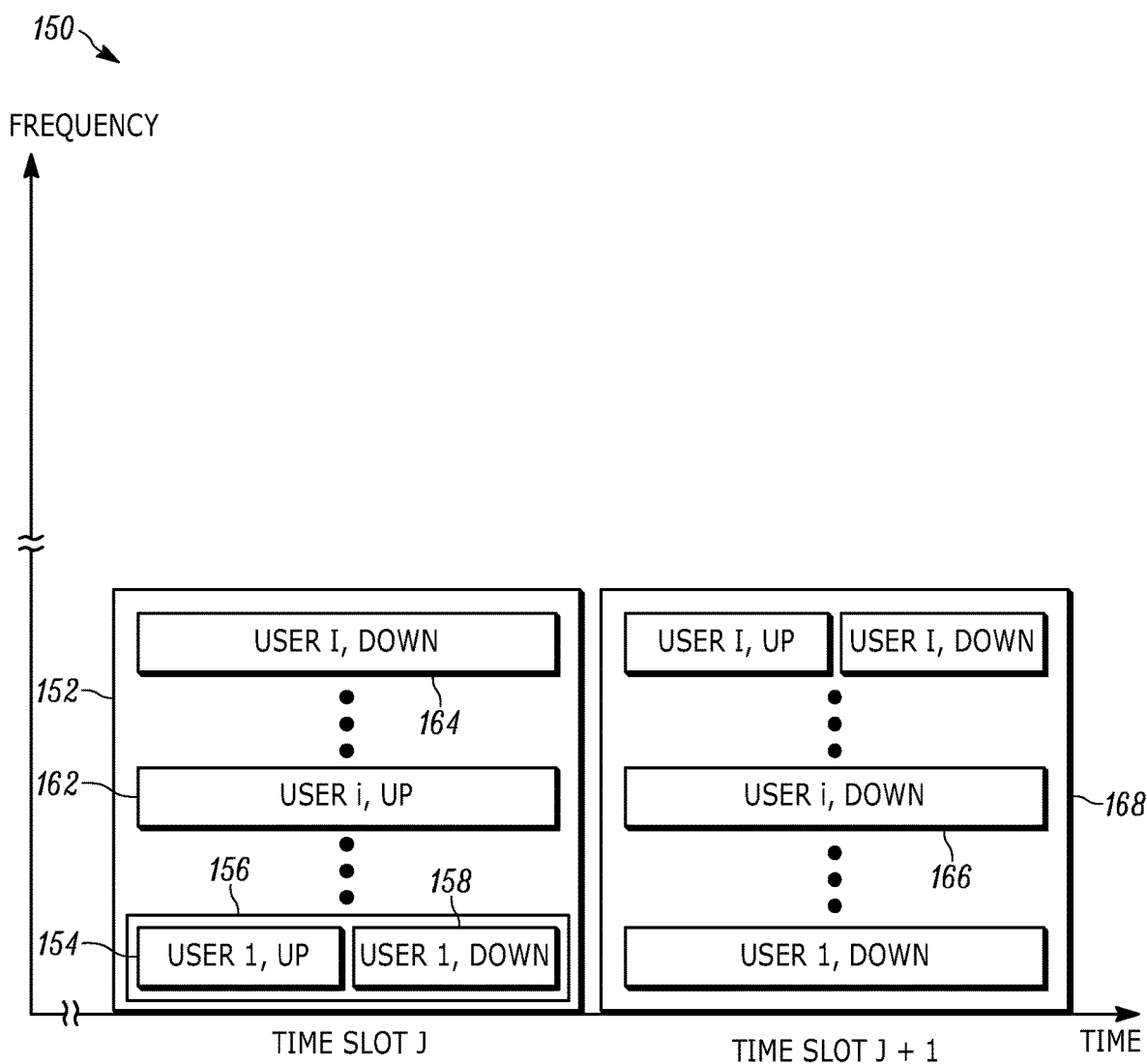
FIG. 1B illustrates a plot of frequency versus time for a known time division duplexing (TDD) system.

FIG. 1B illustrates a plot 150 of frequency versus time for a known time division duplexing (TDD) system. During a block 152 with a duration associated with time slot j 152, a user 1 sends uplink information in resource block 156 that occupies one frequency channel for a time duration of the time slot associated with sub-block 154. That is a time slot that lasts only a portion of the duration of the time of time slot j associated with resource block 156. User 1 receives downlink information in resource block 156 for a time duration of the time slot associated with sub-block 158 that occupies the same frequency channel that was occupied by the uplink information for sub-block 154. This is the frequency channel of resource block 156. In order to avoid contention, user 1 receives the downlink information in a time slot associated with sub-block 158 that occupies a different time in resource block 156 than the time slot associated with sub-block 154 during which the user transmits uplink information. The frequency channel occupied by uplink information time slot of sub-block 154 and the downlink information time slot of sub-block 158 are the same. Consequently, information is transmitted for time durations associated with blocks 154, 158 that occupy disjoint time intervals for the uplink and the downlink. Thus, up and downlink information is flowing on a single frequency channel because the transmitters and receivers operate on nominally disjoint time slots and are not simultaneous. That is, the time slots are not the same for uplink and downlink wireless transmissions. Although some TDD resource blocks apportion their time duration to cover both uplink and downlink signal, most TDD resource blocks commit all their time duration to either sending uplink information or receiving downlink information. Time division duplexing systems also support multiple users during the same time slot. For example, user i sends uplink information in resource block 162 concurrently with user l receiving downlink information in resource block 164. User i sends downlink information at the same frequency channel in a later resource block 166. The frequency channels for different users are also disjoint. As in the FDD system described in conjunction with FIG. 1A, over time, the resource blocks change. For example, resource block j+1 168 occurs at a later time than resource block j 152. One skilled in the art will appreciate that the resource blocks shown in FIGS. 1A and 1B for FDD and TDD are simplified for clarity. However, the use of different time slots for uplink and downlink transmissions on the same frequency channel is the basis for TDD multiplexing, and is also generally representative of wireless time-multiplexed systems that operate on a single frequency channel. The use of different frequency channels to accommodate simultaneous transmission of up and downlink information (e.g. FIG. 1A) is also generally representative of wireless frequency multiplexed systems, FDD. Thus, known wireless systems do not provide the ability to transmit and receive both on a same frequency channel and in a same time slot.

One feature of the present teaching is the ability to provide a continuous, simultaneous link for a single user up and down link that occupies the same frequency channel. We refer to a system that provides a continuous, simultaneous link for a single user's up and down link that occupies the same frequency channel as a single-channel, full-time duplex (SCFTD) system.

Figure 2:
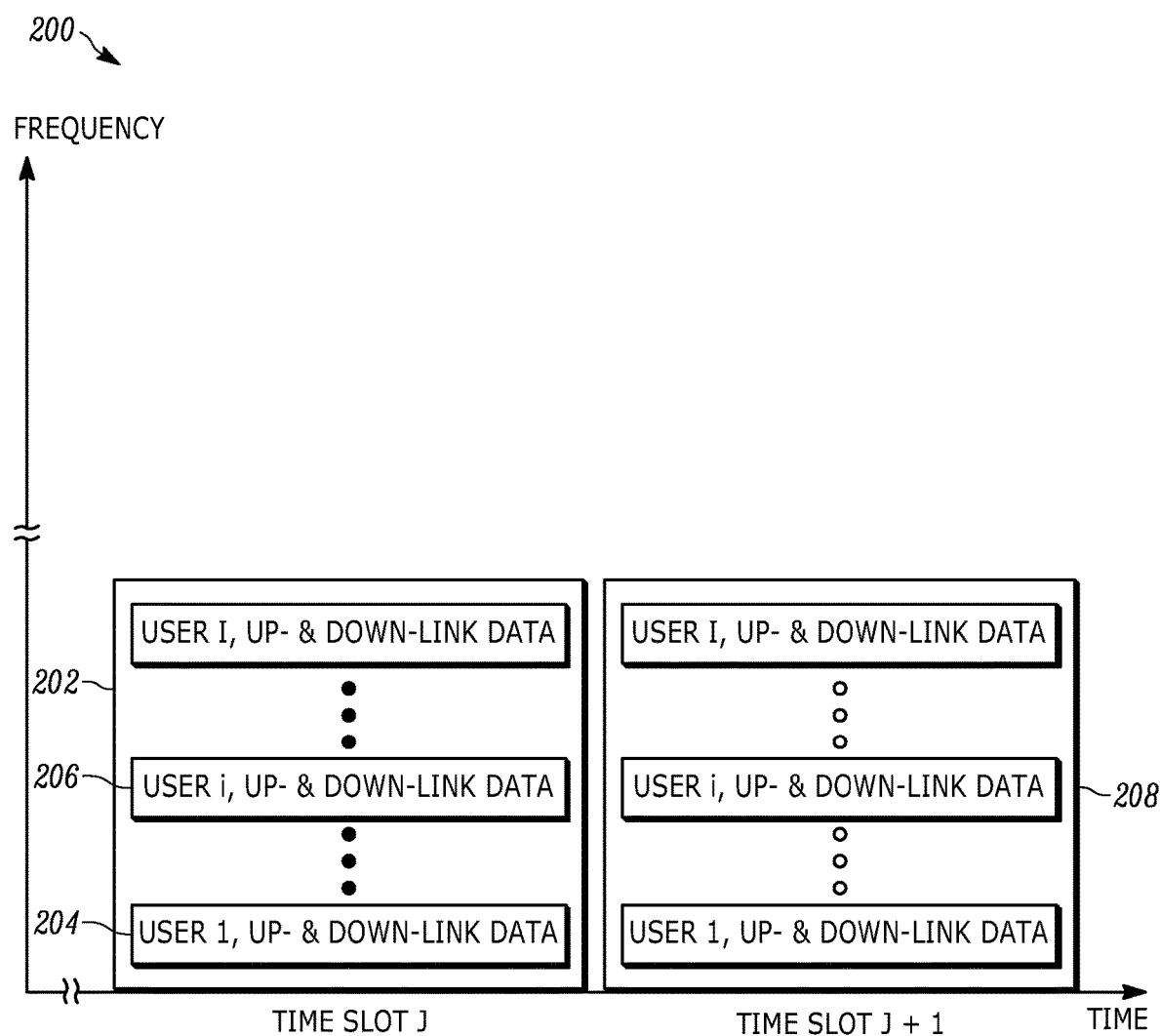
FIG. 2 illustrates a frequency versus time plot for an embodiment of a Single-Channel Full-Time Duplex (SCFTD) system that provides continuous, single-channel, full-time, full-duplex operation according to the present teaching.

FIG. 2 illustrates a frequency verses time plot 200 for a single-channel full-time duplex (SCFTD) that provides continuous, single-channel, full-time, full-duplex operation according to the present teaching. During a block 202 with a time duration associated with time slot j, user 1 sends uplink information in resource block 204 that occupies one frequency channel for a time duration that is the full duration of the time slot j. User 1 also receives downlink information in resource block 204 that occupies the same frequency channel and the same time interval that was occupied by the user 1 uplink information in resource block 204. Thus, the frequency channel occupied by uplink information in resource block 204 and downlink information resource block 204 for the same user 1 are the same. In addition, the time slot occupied by uplink information in resource block 204 and downlink information resource block 204 for the same user 1 are the same. Transmission and reception of uplink information is concurrent with transmission and reception of downlink information. In other words, the transmit signal and the receive signal occupy a same frequency channel and operate simultaneously in a same time slot. The system also supports multiple users during the same time slot j. For example, user i sends uplink information in resource block 206 that occupies a frequency channel that is the same as the frequency channel on which user i receives downlink information in resource block 206. Thus, single-channel, full-time duplex, provides continuous, single-channel, full-time full-duplex operation.

The SCFTD system of the present teaching advantageously supports the same information in nominally half of the bandwidth of electromagnetic spectrum compared to traditional FDD or TDD. This can be understood, for example, by comparing the density of the channel slots in FIGS. 1A and 2, which both represent the same amount of information being communicated between the users. As in the FDD and TDD systems described in conjunction with FIG. 1A-B, over time the resource blocks may change. For example, time slot j+1 208 occurs at a later time than time slot j 202. In comparing FIGS. 1A-B and 2, we see that like TDD, SCFTD operates on a single frequency channel, yet also like FDD, SCFTD provides continuous operation.

One feature of the single-channel, full-time, full duplex wireless communication systems of the present teaching is that same-frequency, simultaneously operating signals can be separated and the information on each signal can then be decoded. With single-channel, full-time duplex, both the time signatures and frequency spectra of the transmit and receive signals overlap. In addition, the transmit signal can be very strong, having a power that can be nominally the same as, and up to many orders of magnitude larger than the receive signal. As such, removing the transmit signal when the transmit and receive signal are both operating simultaneously and at the same frequency is challenging without using traditional multiplexing techniques. Hence, a key to enabling the realization of SCFTD is a means of separating the transmit and receive signals. In some embodiments, the transmit and receive signal are, at least to some degree, uncorrelated. To state this condition formally, consider a transmit signal, T(t) and a receive signal R(t). The correlation, C, between these two signals can be written as:

$$C = \frac{\frac{1}{T}\int_0^T T(t) * R(t)dt}{T_{RMS} R_{RMS}}.$$

Where $$T_{RMS} = \sqrt{\frac{1}{T}\int_0^T T^2(t)dt} \text{ and } R_{RMS} = \sqrt{\frac{1}{T}\int_0^T R^2(t)dt}$$

If T(t) and R(t) are completely correlated, then C=1. If T(t) and R(t) are completely uncorrelated, C=0. In this later condition, T(t) and R(t) are also referred to as being orthogonal. Hence, in some embodiments, the transmit signal and receive signal of single-channel full-time duplex satisfy the condition C<1, i.e. that T(t) and R(t) are at least to some degree uncorrelated. The required degree of decorrelation depends on the specifics of the system in which single-channel, full-time duplex is being used since the degree of decorrelation impacts system parameters such as the transmit-to-receive isolation and the bit error rate that can be achieved.

In the present 4G LTE format, the downlink is sent via orthogonal frequency division multiplexing (OFDM) while the uplink is sent via single carrier frequency division multiplexing (SC-FDM). Applying the above equation to these two signal formats confirms that the average correlation between these two modulation formats, with different random data on each format, is zero. However, on any given resource block the correlation can be as high as ±0.2 That is, a 4G LTE uplink and downlink signal will satisfy the condition for some embodiments of the SCFTD system and method of the present teaching, C<1. The minimum correlation first occurs for a delay of ~6 samples off perfect alignment, which has C=1. Using just one resource block of the present 4G LTE format, which has a bandwidth of only 180 KHz, this corresponds to a delay of ~4 microsecond; higher bandwidths would results in proportionally shorter delays. To achieve this delay by simply delaying the signal at RF, i.e. without demodulating the signal, would require ~4000 feet of coaxial cable. An alternative to delaying at RF is to demodulate the signal and delay it digitally. Once the signal to be repeated is in the digital domain, another option to reduce the correlation is to apply a different scrambling pattern to the data. Such techniques are well known in the art, see for example U.S. Pat. No. 7,155,128, which is incorporated herein by reference.

In some applications of single-channel, full-time duplex, such as a repeater, the signal that is transmitted is an amplified version of the received, i.e. T(t)=GR(t), where G is the amplification. In these situations, the transmit and receive signals would be correlated. However, if the receive signal contains modulation, then with a sufficient delay, τ, the transmit signal will be uncorrelated from the receive signal. Expressing this condition as an equation the condition for single-channel full-time duplex to work in a repeater application is:

$$C = \frac{\frac{1}{T}\int_0^T T(t+\tau)GR(t)dt}{T_{RMS} R_{RMS}} < 1.$$

In the context of 4G LTE systems, this condition means that even if the same modulation format were to be used for both the up- and down-links, they still could be sufficiently uncorrelated, even with no or small delays, to permit SCFTD operation, since they would have different data on each link.

Like time division duplexing, single-channel, full-time duplex supports full-duplex operation on unpaired spectrum, since it requires only one frequency channel per mobile user for full-duplex operation.

Alternatively, if single-channel, full-time duplex were used with paired spectra as in FDD, SCFTD would enable doubling the capacity. This is because SCFTD supports full-duplex using only one of the frequency bands, either the up- or the down-link, that were both required by FDD. Hence, the other band could be used to support a second set of mobile users, thereby doubling the capacity. This can be seen by comparing FIG. 1A and FIG. 2. The upper band that is blank in FIG. 2 could be filled with a second set of mobile users.

In massive MIMO, the base station has multiple antennas, up to on order of 100, at different locations on the tower. By contrast, cell phones today have just one antenna. In general, the cell phone sends a special reference signal up to the base station, which receives the signal on each of its multiple antennas. But, since each of the antennas is in a slightly different location, it will get a slightly different version of the signal from the cell phone. Not only are the base station antennas in slightly different locations, but the paths that the signal traveled from cell phone to base station are also slightly different, due to multipath effects. These differences in how the reference signals from the cell phone are received contain information about the paths between the cell phone and each of the base station antennas. If the base station uses the same carrier frequency to send data back down to the cell phone, then reciprocity holds, i.e. the path from cell phone to base station will be the same as the path from base station to cell phone. It is therefore advantageous to provide a system that allows uplink and downlink communication on the same frequency. However, the only cell phone format at present that uses the same frequency for both up- and down-links is time division duplexing, TDD. The disadvantage of time division duplexing is that it cannot send uplink and downlink information at the same time.

Figure 3:
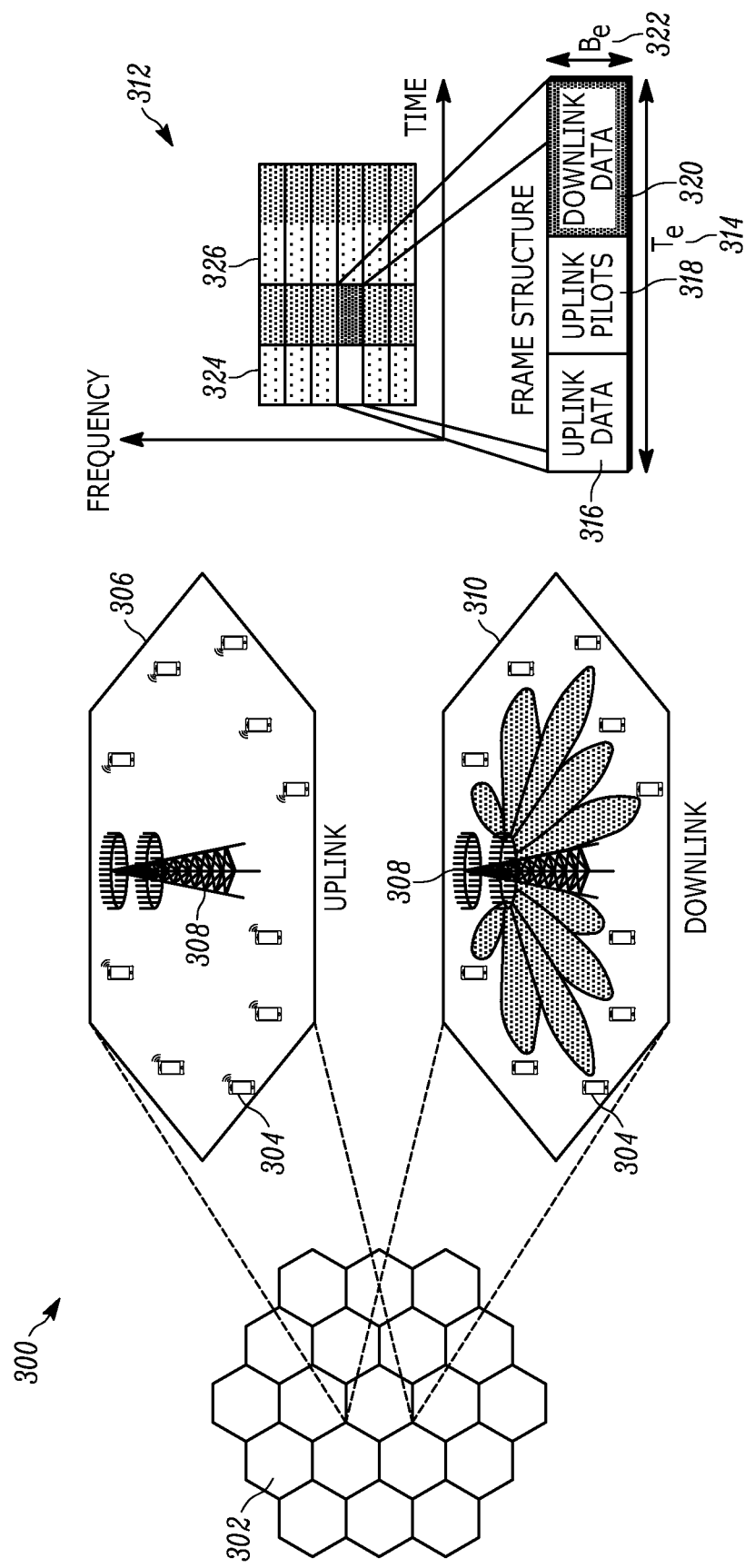
FIG. 3 illustrates an embodiment of a massive Multiple-Input and Multiple-Output (MIMO) system in which known TDD is used.

FIG. 3 illustrates a known massive MIMO system 300. Multiple, hexagonally-packed cells 302 of a cellular communications system are provided. Each cell 302 defines an area in which mobile users 304 are located. For example, an expanded view 306 of one cell with a base station 308 in the center and ten mobile users 304 surrounding the base station 308. The expanded view 306 illustrates one cell with a base station in the center and i=1, 10 users surrounding the base station. The expanded view 306 of one cell illustrates one time slot during which each of the ten mobile users 304 are sending signals up to the base station. An expanded view 310 illustrates the same cell at a subsequent time slot when the base station 308 is sending signals down to the users 304. A frequency verses time plot 312 shows one time slot 314 during which the mobile user 304 sends both data in slot 316 and a pilot signal in slot 318 to the base station 308 and a subsequent time interval during which the base station sends downlink data in slot 320 to a particular one of the 10 of the mobile users 304. The slots 316, 318, 320 occupy a frequency channel bandwidth 322, $B_e$. From the perspective of the base station 308, an antenna sends downlink information on a wireless transmit channel. A base station antenna receives uplink information on a wireless receive channel. From the perspective of a mobile user 304, an antenna sends uplink information on a wireless transmit channel, and receives downlink information on a wireless receive channel. A wireless transmit and/or wireless receive channel is characterized, for example, by a particular channel frequency that may be allocated as part of the cellular system, as well as the propagation path characteristics through which the wireless signal propagates. We note that signals sent wirelessly to and from the base station and a particular mobile users will have different wireless channel characteristics than signals sent to another mobile user because, for example, they are in different locations.

To appreciate in more detail how SCFTD supports massive MIMO first requires an understanding of how massive MIMO is presently supported by TDD. FIG. 3 illustrates how TDD is used to support a Massive MIMO capability, which is also known as "Large-Scale Antenna Systems", "Very Large MIMO", "Hyper MIMO", "Full-Dimension MIMO" and "ARGOS". As shown in the frequency verses time plot 312, during each block 324, 326, data are exchanged between the base station and the mobile users. However, only the mobile users send pilot signals during the up-link interval 318 associated with a time interval of block 324 to the base station, from which the base station calculates the up-link channel state information (CSI) for the wireless channel. If we assume that the wireless channel conditions, such as the frequency, multipath, etc. are constant, then channel reciprocity states that the CSI for the ith user during the j+1 time slot, CSI(i, j+1), down-link for each particular mobile user will be the same as the CSI of the jth up-link for that same user, i.e. CSI(i, j)=CSI(i, j+1). This means that as long as reciprocity holds, the base station does not need to measure the down-link CSI between the base station and each of the mobile users. The base station can use the CSIs that were measured on the up-link between the mobile users and the base station for sending data on the down-link to the mobile users. In practice, the channel conditions of the wireless transmit and/or receive channel are not perfectly constant, but they remain sufficiently constant for a period of time known as the coherence time. As such, the base station can use the CSIs that were measured on signals from the up-link wireless receive channel between the mobile users and the base station for sending data on the down-link wireless transmit channel to the mobile users.

One feature of the SCFTD of the present teaching is that it can support channel reciprocity, which in turn enables MIMO in general, and Massive MIMO in particular. As was shown in the Massive MIMO example of FIG. 3, Massive MIMO has the ability to increase the spectral efficiency by 10 times or more. Hence SCFTD extends the spectral efficiency gains of Massive MIMO to FDD, which is 80% of cellular systems vs. only 20% that use TDD.

Referring back to FIG. 2, the frequency verses time plot 200 for SCFTD is shown to support Massive MIMO. Unlike conventional FDD, SCFTD uses a single frequency channel to send data from the base station to, and simultaneously receive data sent from, mobile users. This means that the CSI that is determined for the ith user from time slot j is for the same frequency that will be used by the base station to send data to ith mobile user during the j+1 time slot. Hence, channel reciprocity holds at least for a coherence time, which means CSI(i, j)=CSI(i, j+1). Consequently SCFTD enables a fully reciprocal CSI condition that was enabled by TDD, but with nominally twice the information carrying capacity. As such, SCFTD can support Massive MIMO, but with more information transferred. Thus, one skilled in the art will appreciate that the present teaching allows FDD-like simultaneous operation on up- and down-links, but with the up and down links using on the same frequency. Therefore, reciprocity would hold and Massive MIMO is possible. Said another way, unlike prior art wireless systems, the systems of the present teaching use a single frequency channel to simultaneously transmit uplink and downlink information between a base station and a mobile user, thereby providing a fully reciprocal CSI. Prior art systems like FDD use two different frequencies. Prior art TDD systems use two disjoint time slots and are not simultaneous. Thus, the system of the present teaching provides better channel state information and uses less bandwidth than prior art systems. This is because channel state information is determined for an uplink and a downlink on a same channel frequency at a same time. Thus, MIMO with TDD measures CSI during time slot j, and uses CSI(j) during time slot j+1; then measures CSI during time slot j+2, and use CSI(j+2) during time slot j+3, and so on. Using MIMO with SCFTD according to the present teaching measures CSI during time slot j, and uses CSI(j) during time slot j+1 and simultaneously measures CSI during time slot j+1; then uses CSI(j+1) during time slot j+2 and simultaneously measures CSI during time slot j+2, and so on.

One feature of the present teaching is the use of a simultaneous transmit and receive (STAR) approach to connect the antenna to a transmitter and receiver. A STAR communication processor may be a front end that connects the antenna to the transmitter and receiver. The transmitter may be a transmit processing system that provides the necessary signal processing to generate a transmit signal that can be sent over a wireless channel. The receiver may be a receive processing system that further processes the receive signal that is received by the antenna over the wireless channel. In general, the communication processor of the present teaching uses a STAR architecture to pass signals to an antenna from a transmit processor and from an antenna to a receive processor. A STAR communication processor is configured to provide the simultaneous transmission of a transmit signal to a transmit processor and reception of a receive signal at a receive processor for transmit and receive signals that occupy a same frequency channel. An additional feature of the STAR architecture is that the same communication processor can also allow transmission and reception of transmit signals and receive signals that occupy disjoint frequency channels. That is, the STAR communication processor can connect transmit and receive signals through a same bidirectional input port at any frequency channel. Note that the STAR communication processor as well as other features and functions of the present teaching are not restricted to connection of an antenna. A variety of transmit/receive elements can be connected to transmit and receive processors using a STAR communication processor, such as, for example, wired transmit and receive elements that connect to, for example, a network connected via coaxial cable or other wired infrastructures.

Figure 4A:
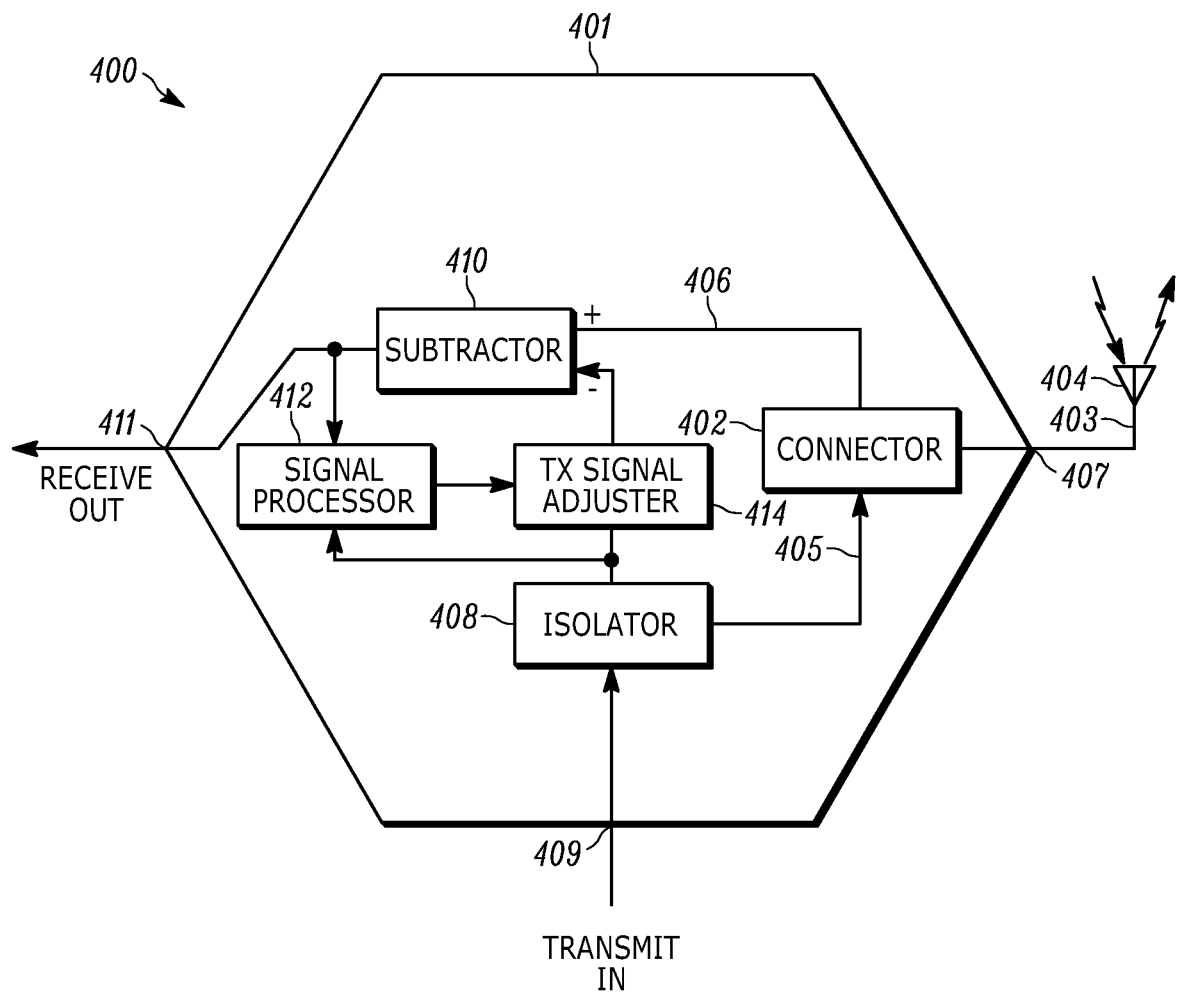
FIG. 4A illustrates a block diagram of an embodiment of the communication processor of a single-antenna, single-channel, full-time, full-duplex transmit-receive system comprising a subtractor of the present teaching.

FIG. 4A illustrates a block diagram of an embodiment of an RF communication processor that provides a simultaneous transmit and receive (STAR) system 400. See, for example, U.S. patent application Ser. No. 14/417,122, entitled "Same-Aperture Any-Frequency Simultaneous Transmit and Receive", which is assigned to the present assignee and, which is incorporated herein by reference. A STAR communication processor 401 will be a key part of a single-antenna SCFTD transmit-receive system according to the present teaching. The antenna 404 for this system would be positioned, for example, as one of the multiple antennas in the base station 308 described in conjunction with FIG. 3 or the single antenna of the mobile user. A connector 402 connects three signal paths, one path 403 from and to the antenna 404 that passes a first port 407, one path 405 from the transmit port 409 and one path 406 to a port 411 at the input of a receiver. If not provided by other means, an optional signal isolator 408 can be present in the transmit signal path 405 from port 409. A signal differencing device or equivalently a signal subtractor 410 connects to the transmit signal adjuster 414 and the signal connector 402. One input of the subtractor 410 is connected to the receive path 406. Another input of subtractor 410 is connected to the transmit signal path 405 via the optional isolator 408 that is designed to isolate any residual receive signal so that a clean copy of the transmit signal is applied to the Tx signal adjuster 414. In operation, the subtractor 410, subtracts out the potentially large transmit signal that is in the receive path 406 leaving just the receive signal to proceed to the receive port 411.

If the transmit signal environment is sufficiently stable, it is possible to provide a transmit signal of fixed complex value to the second port of the subtractor 410. However, in many STAR systems 400, the transmit environment around the antenna 404 will change as a function of time, which in turn will cause the complex value of the transmit signal reflected by the antenna to change. A signal processor 412 determines the precise complex value of the transmit signal that should be fed to the second terminal of the subtractor 410 so as to minimize the residual transmit signal that is present in the receive path. A transmit signal adjustment circuit 414 is used to set the complex value of the transmit signal that is determined by the signal processor 412. We note that the condition C<1 described earlier can be relevant to embodiments of SCFTD systems that use the communication processor 401.

In the case of massive MIMO, a pilot signal is transmitted on an uplink to the transmit-receive antenna 404 simultaneously with the transmit signal being sent on a downlink by the transmit-receive antenna 404. Because the antenna 404 is the same for both the uplink and downlink paths, which would not be possible without a SCFTD system 400 of the present teaching, the uplink pilot channel follows the same physical path as the downlink transmit signal, and in addition, the uplink and downlink occupy the same frequency channel the agreement between the measured uplink CSI and the downlink CSI is excellent. In addition, because of the simultaneity of transmission of the pilot signal and the transmit signal, which would not be possible without a SCFTD system 400 of the present teaching, the pilot signal channel is nearly identical as a function of time to the channel for the transmit signal. As such, massive MIMO processing can occur nearly independent of correlation-time concerns described above.

Figure 4B:
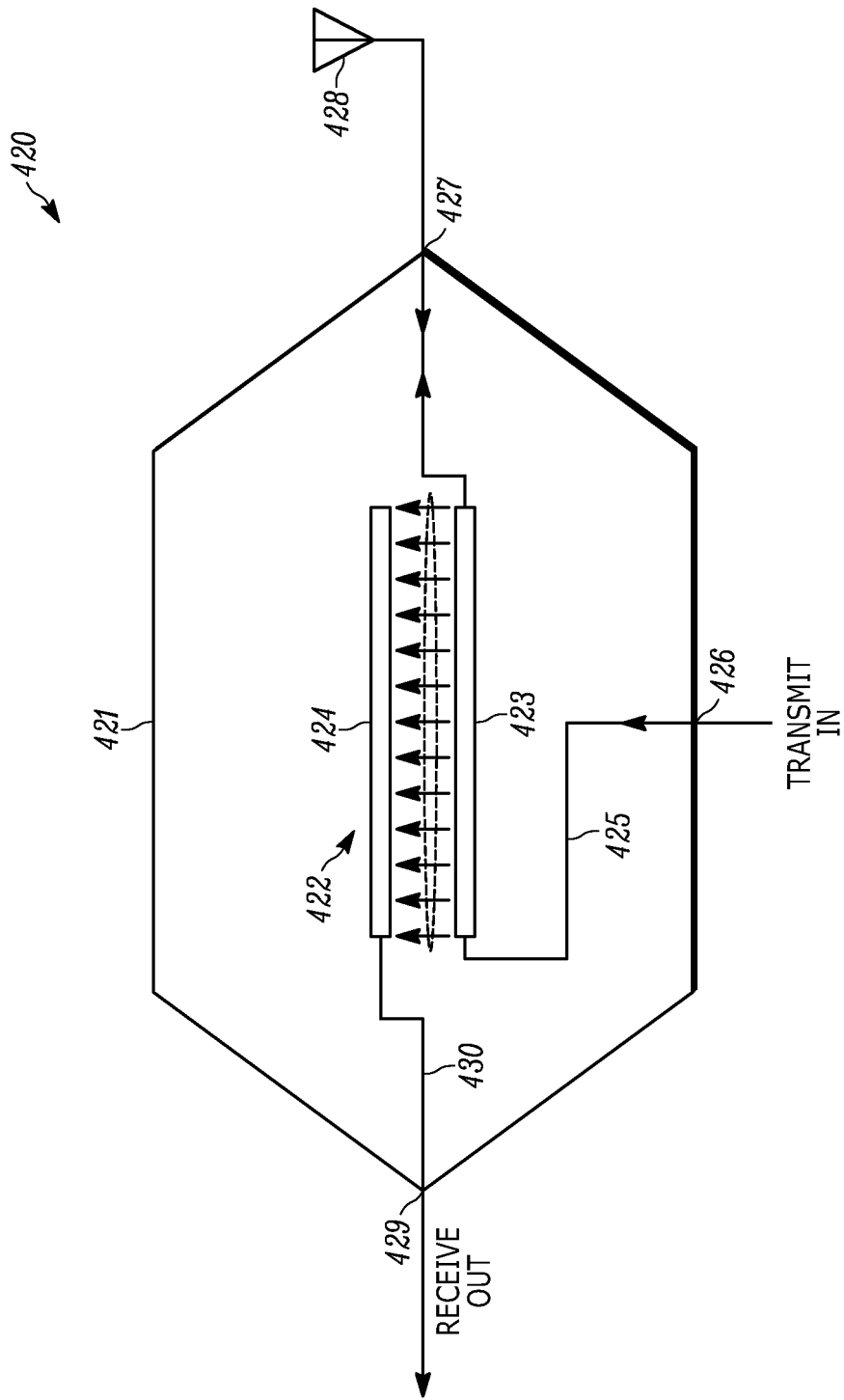
FIG. 4B illustrates a block diagram of an embodiment of the communication processor of a single-antenna, single-channel, full-time, full-duplex transmit-receive system comprising a non-reciprocal waveguide of the present teaching.

FIG. 4B illustrates a block diagram of an embodiment of the communication processor of a single-antenna, single-channel, full-time full-duplex transmit-receive system 420 comprising a non-reciprocal waveguide 422 of the present teaching. See, for example, U.S. Pat. No. 7,555,219, entitled "Bi-Directional Signal Interface", which is assigned to the present assignee and, which is incorporated herein by reference. The communication processor 421 includes the non-reciprocal waveguide 422 that includes a first traveling wave waveguide 423 and a second traveling wave waveguide 424 that are positioned such that electromagnetic field couples between them in a non-reciprocal manner. That is, the electromagnetic fields couple strongly in one direction and are substantially prevented from coupling in the opposite direction. Such non-reciprocal coupling causes isolation between the input and output ports. A variety of known non-reciprocal waveguide devices can be used, including, for example, circulators, electronic distributed amplifiers and/or optical modulators.

The transmit path 425 carries the transmit signal from a port 426 to the first traveling wave waveguide 423 and on to the bidirectional port 427 that connects to the bidirectional antenna 428. Bidirectional signals passed by the antenna 428 and the port 427 can be at the same frequency channel and operate simultaneously. A signal received through bidirectional port 427 is conveyed in a non-reciprocal manner from the first traveling wave waveguide 423 to the second traveling wave waveguide 424 and passed to the receive port 429 via receive path 430 that carries the receive signal to a receiver. Because of the non-reciprocal coupling between waveguides 423, 424, most of the transmitted signal is coupled to the bidirectional port 427 along the transmit path, and very little is transmitted to the receive port 429. That is, the system provides a receive signal with substantially no transmit signal to a receive port 429 even in the case where the transmit and receive signal operate simultaneously in the same frequency channel.

Figure 4C:
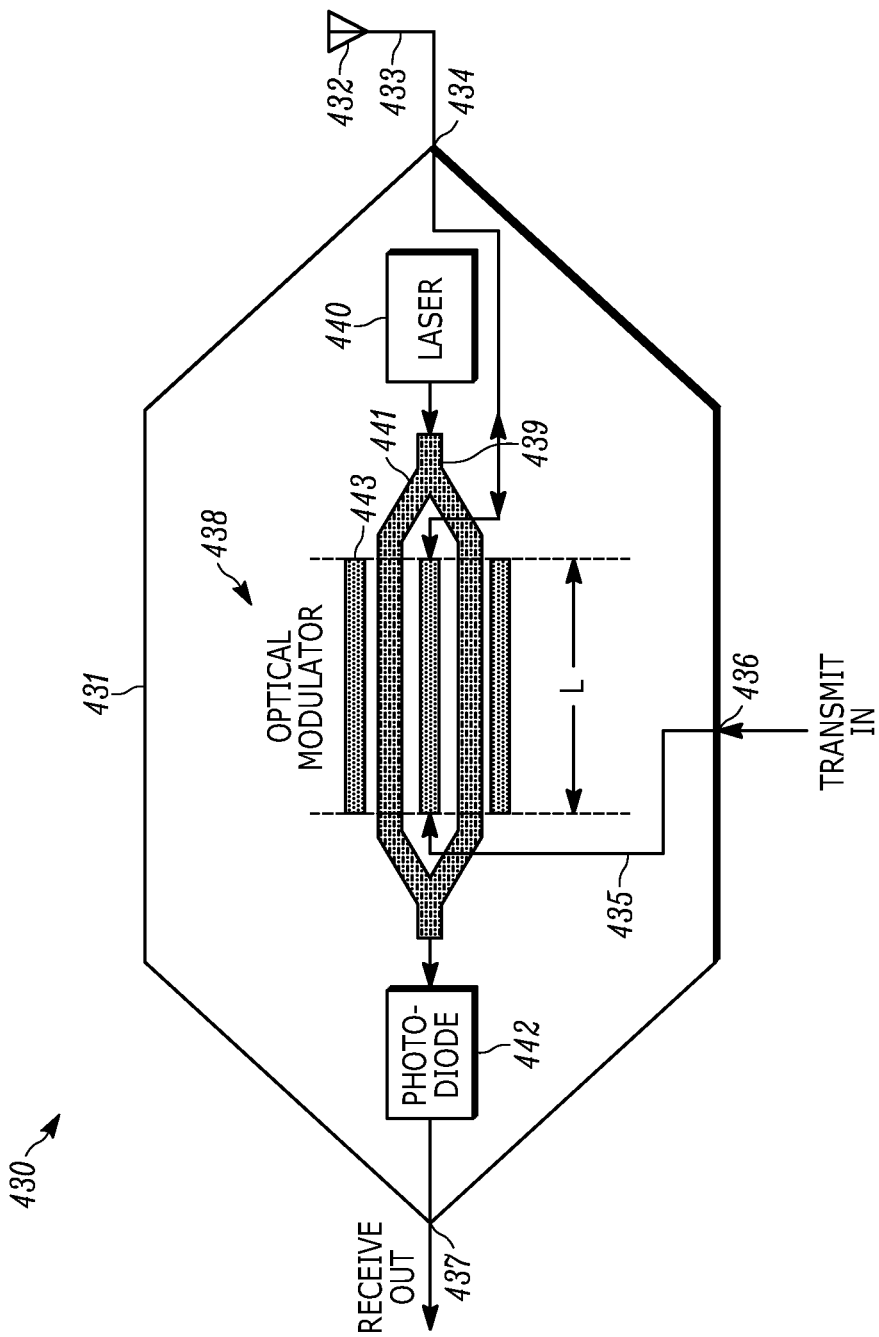
FIG. 4C illustrates a block diagram of an embodiment of the communication processor of a single-antenna, single-channel, full-time, full-duplex transmit-receive system comprising an optical modulator of the present teaching.

FIG. 4C illustrates a block diagram of an embodiment of the communication processor 431 of a single-antenna, single-channel, full-time full-duplex transmit-receive system 430 comprising an optical modulator of the present teaching. See, for example, U.S. Pat. No. 8,433,163, entitled "Bi-Directional Signal Interface with Enhanced Isolation", which is assigned to the present assignee and, which is incorporated herein by reference. An antenna 432 connects to a bidirectional signal path 433 that passes through bidirectional port 434. A transmit signal is provided on a transmit signal path 435 via port 436. A receive signal is provided at receive port 437. Within the communication processor 431, an optical modulator 438 has an optical input port optically connected to a laser 440 or other optical source that generates an optical signal. The optical signal passes through optical waveguides 441 of the optical modulator 438 to an output photodiode 442 that detects the optical signal and passes the resulting electrical detected signal to the port 437. The electrode structure 443 in this embodiment comprises three electrodes of length L; other embodiments would use different number of electrodes. The bidirectional path 433 is connected to one end of the electrode structure 443, and the transmit path 435 is connected to the other end of the electrode structure 443 from the transmit path 435 connection. In operation, an incoming signal is received at bidirectional port 434 and propagates to the electrode structure 433 that imparts this incoming signal onto the optical signal passing through the optical modulator 438. This optical signal is then detected by the photodiode 442 and an electrical version of the incoming signal is passed to port 437. The transmit signal on transmit path 435, however, is not imparted on the optical signal, and so does not pass to port 437, and rather is passed to the bidirectional port 434 and to antenna 432 for transmission via bidirectional path 433. This operation is due to the non-reciprocal nature of the optical modulator. Note that the bidirectional path 433 comprises both the transmit path and the receive path.

Figure 4D:
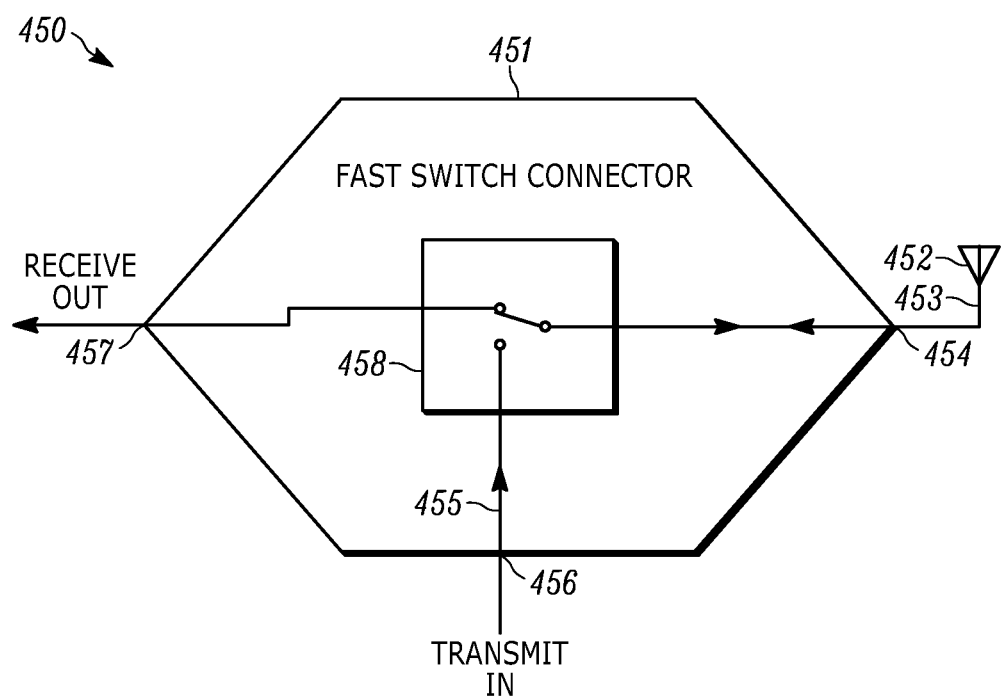
FIG. 4D illustrates a block diagram of an embodiment of the communication processor of a single-antenna, single-channel, full-time, full-duplex transmit-receive system comprising a fast switch of the present teaching.

FIG. 4D illustrates a block diagram of an embodiment of the communication processor 451 of a single-antenna, single-channel, full-time full-duplex transmit-receive system 450 comprising a fast switch 458 of the present teaching. See, for example, U.S. Pat. No. 9,209,840, entitled "Same-Aperture Any-Frequency Simultaneous Transmit and Receive", which is assigned to the present assignee and, which is incorporated herein by reference. An antenna 452 connects to a bidirectional signal path 453 that passes through bidirectional port 454. A transmit signal is provided on a transmit signal path 455 via port 456. A receive signal is provided at receive port 457 via a receive path from port 454. The fast switch 458 has a first port connected to bidirectional port 454, a second port connected to port 456, and a third port connected to port 457. The fast switch 458 connects port 454 to port 457 for a short period of time referred to as a sample time and using a sampling rate that is nominally a Nyquist rate of the receive signal. In some embodiments, the sample time is 1% of the sampling interval that is dictated by the Nyquist rate. For the remaining sampling interval, the receiver is not connected to port 454, and the transmit path 455 from port 456 is connected to port 454. Thus, there is negligible loss in transmit power to the antenna 452, because 99% of the time, the transmit path 455 is providing signal to the antenna 452. Note that the fast switch 458 is shown as a three terminal switch, however, two two-terminal switches can also be used, which allows different sampling and connection times for the transmit signal and the receive signal. We note that the condition C<1 described earlier can be relevant to embodiments of SCFTD systems that use the communication processor 451. Also note that the embodiments of communication processors illustrated in FIGS. 4B-C do not involve making any processing adjustments to the transmit and/or receive signals. The isolation of these techniques used in the communication processors of FIGS. 4B-C comes about because of the physical properties of the device, which are independent of the signals going through them. On the other hand, embodiments of communication processors of FIG. 4A and, in some cases, FIG. 4D do make calculations based on the signals. Hence these communication processors may rely on signal processing, which means correlation is important.

As illustrated in the embodiments of FIGS. 4A-D, STAR can be accomplished using one antenna that handles both transmit and receive. In some embodiments, two antennas are utilized. In the context of this teaching, it is to be understood that the terms "one antenna" can refer to single antenna element, or a collection of antenna elements that act collectively as a single antenna element. For example, FIG. 3 illustrates two circular antenna arrays, as would be used for Massive MIMO. Such a configuration would be considered "two antennas" in the context of the present teaching, with each circular array acting as a single antenna element.

Figure 5:
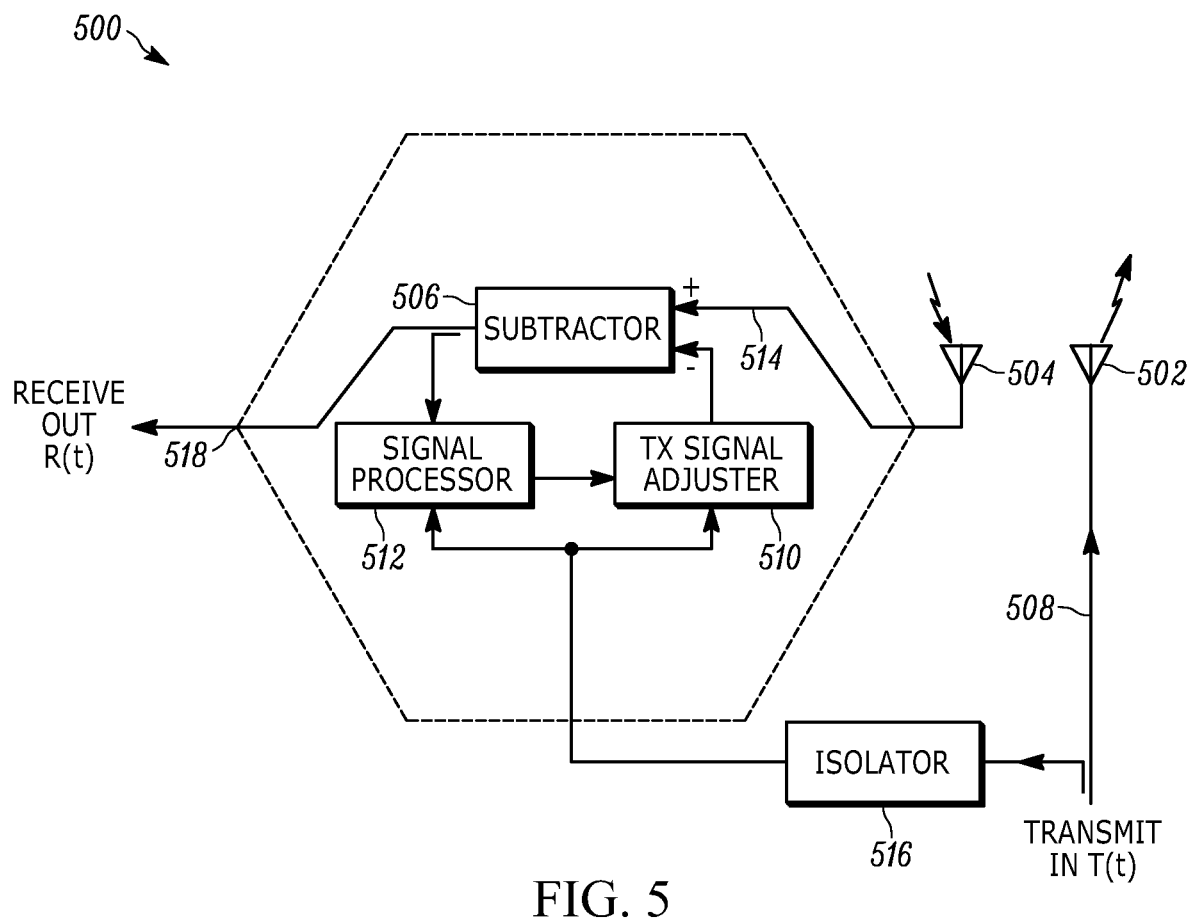
FIG. 5 illustrates a block diagram of an embodiment of the communication processor of a dual-antenna, single-channel, full-time, full-duplex transmit-receive system of the present teaching.

FIG. 5 illustrates a block diagram of an embodiment of a dual-antenna STAR system 500 of the present teaching. In this embodiment, there is one antenna 502 for transmit and a separate antenna 504 for receive. Both the embodiment described in connection with FIGS. 4A-D and the embodiment described in connection with FIG. 5 suppress a residual transmit signal from the receive path. The antennas 502, 504 for this system would, for example, be positioned in close proximity in the base station 308 described in conjunction with FIG. 3. The receive antenna 504 is connected to one input of a subtractor 506 via the receive path 514. The transmit antenna 502 is connected to a transmit signal path 508. The transmit signal is also sent through an isolator 516 to a transmit signal adjuster 510 and a signal processor 512. The transmit signal adjustment circuit 510 is used to set the complex value of the transmit signal. The output of the transmit signal adjustment circuit 510 is connected to a second input to the subtractor 506. A signal processor 512, with one input connected to an output of the subtractor, and a second input connected to the transmit signal path, determines the precise complex value of the transmit signal for the transmit signal adjuster 510. This ensures that subtractor 510 is able to minimize the residual transmit signal that is present at the receive out port 518.

In the case of massive MIMO, a pilot signal is transmitted on an uplink to the receive antenna 504 simultaneously with the transmit signal being sent on a downlink by the transmit antenna 502. Because of the proximity of the two antennas, which would not be possible without a SCFTD system 500 of the present teaching, the pilot channel is very close to the channel for the transmit signal, which means the CSI is a high quality replica. In addition, because of the simultaneity of transmission of the pilot signal and the transmit signal, which would not be possible without a SCFTD system 500 of the present teaching, the pilot channel is very close to the channel for the transmit signal, and independent of any correlation time concerns. The embodiment illustrated in FIG. 5 uses a subtractor-based STAR that is similar to that of the single-antenna embodiment illustrated in FIG. 4A. As is understood by those skilled in the art, the other configurations of STAR illustrated in FIGS. 4B-D can also be used with a dual antenna implementation.

In the embodiments illustrated in FIG. 4A and FIG. 5, a reference copy of the transmit signal is subtracted from the receive+transmit signal in the receive path. In the case where the exact magnitude and phase of the transmitted signal component in the receive path is known, then the subtraction of the signal at one input of the subtractor 410, 506 from the receive+transmit signal at the second input of the subtractor 410, 506 yields just the receive signal. However, in most applications of practical interest, one does not know the magnitude and phase with sufficient precision to achieve the desired level of suppression of the transmit signal component in the receive path. In these cases, an adaptive loop may be implemented, as shown in FIG. 4A and FIG. 5. A portion of the output from the subtractor 410, 506, that contains both the receive signal and the residual transmit signal, is fed to the signal processor 412, 512. The transmit signal is also fed to the signal processor 412, 512. The signal processor correlates these two signals. The transmit component of the subtractor output will have high correlation with the transmit signal, while the receive component of the subtractor output will have low correlation, under the conditions described above. Thus, the output of the correlator can be used to feed a signal adjuster so as to improve the suppression of the transmit component at the output of the subtractor 410, 506. That is, when C<1, the correlation will provide a sufficient reproduction of the transmit signal to enable the subtractor 410, 506 to remove the residual transmit signal from the receive path 514.

Figure 6:
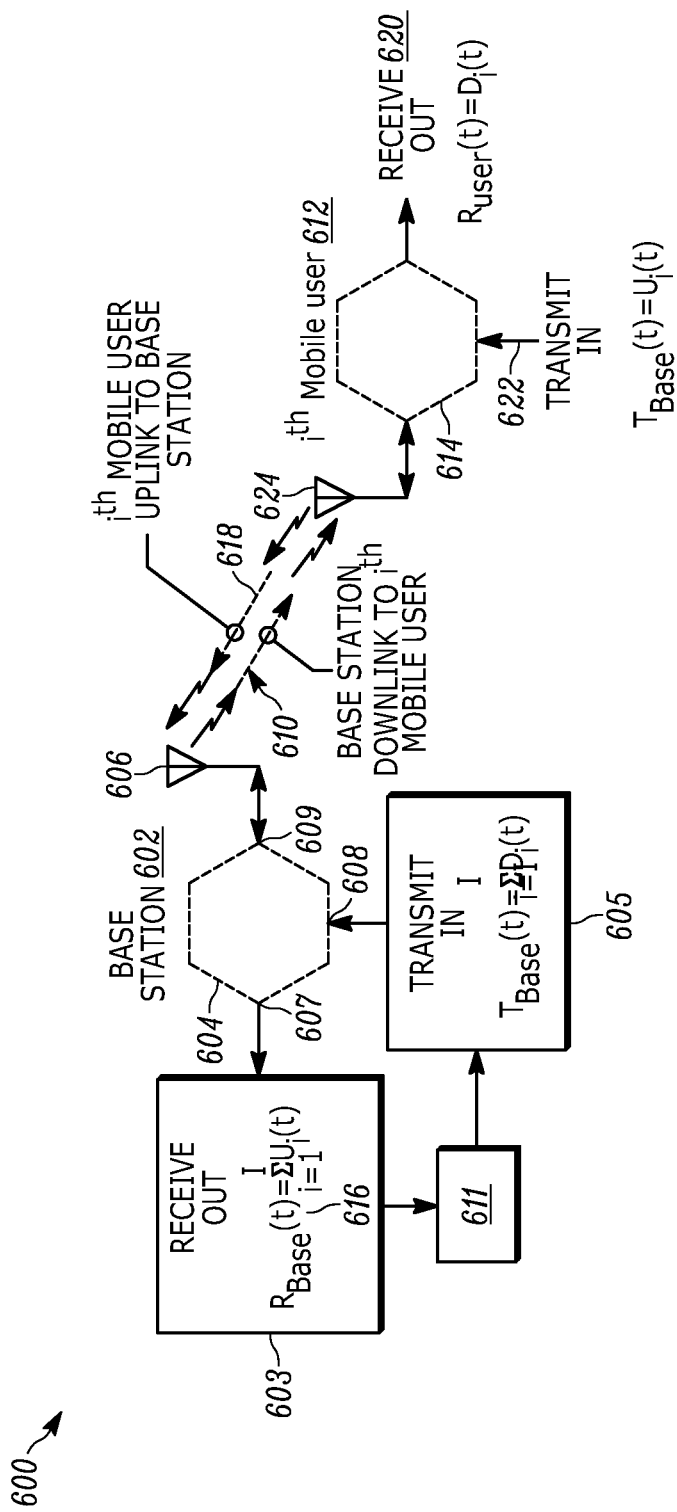
FIG. 6 illustrates an embodiment of a single-channel, full-time, full-duplex wireless transmission system in a mobile cellular communications configuration with a single antenna base station and a single antenna mobile user of the present teaching.

FIG. 6 illustrates an embodiment of a single antenna, single-channel, full-time, full-duplex wireless transmission system 600 in a mobile cellular communications configuration of the present teaching. A base station 602 includes a communication processor 604 that implements a system and method for removing a residual transmit signal from a receive signal, such as the STAR systems described in U.S. patent application Ser. No. 14/417,122, entitled "Same-Aperture Any-Frequency Simultaneous Transmit and Receive Communication System", which was incorporated herein by reference, or as described in connection with FIGS. 4A-D and FIG. 5 of the present disclosure. The communication processor 604 allows two signals at a same frequency and a same time and are sufficiently uncorrelated to be sent through the antenna 606.

At the base station 602, the transmit signal in a transmit path that passes through port 608, $T_{Base}(t)$, is the downlink signal, $D_i(t)$, that is destined for the $i^{th}$ mobile user:

$$T_{Base}(t)=D_i(t).$$

In the embodiment of FIG. 6, where the base station 602 uses a single antenna 606 for both transmit and receive, the high power transmit signal passes through the communication processor 604 where a portion of the transmit signal is tapped off from transmit path that passes through port 608 and serves as the reference for the subtraction of the residual transmit signal in the receive path as described in conjunction with FIG. 4A and FIG. 5. In some embodiments, the transmit signal in transmit path passing through port 608 does not appear on a receive output port 607 of the communication processor 604 because the communication processor 604 uses an embodiment illustrated in FIGS. 4B-D.

At the base station 602, a receive processor 603 is connected to a receive output port 607 of the communication processor 604. The receive processor 603 accepts the receive signal passed from port 607. As described earlier, the communication processor 604 passes a receive signal on a receive path that connects port 609 to port 607 and passes a transmit signal from port 608 to port 609. The transmit signal and receive signal operate simultaneously on a same frequency channel. A transmit processor 605 is connected to port 608 and the transmit signal it generates follows the transmit path to port 609 and onto antenna 606. The antenna sends the transmit signal on wireless channel 610. The antenna 606 receives a receive signal from wireless channel 618. The STAR system communication processors 604, 614, which are at the base station and mobile user, respectively, enable the same frequency channel to be used to convey both uplink and down link wireless channels 610,618. With the two channels being conveyed on the same frequency, this means that in a radical departure from conventional FDD, no frequency selective hardware—such as filters, duplexers, etc.—can be used to separate the uplink wireless channel 618 from the downlink wireless channel 610. Conversely, since there is no frequency selective hardware in communication processors 604, 614, this means the embodiment shown in FIG. 6 is not constrained to operate in STAR mode—it can equally well operate in conventional FDD mode. The transmit processor 605 generates the transmit signal. The receive processor 603 processes the receive signal. A channel state information processor 611 calculates channel state information for the wireless receive channel using the receive signal, and provides modifications to the transmit signal to the transmit processor 605 based on the CSI information. The CSI is of exceptional quality because the transmit signal and the receive signal on which it is based occupy a same frequency channel at a same time. While the channel state information processor 611 is shown as a separate element, this processor can be contained in either the communication processor 604 or the other processors 603, 605.

Figure 7:
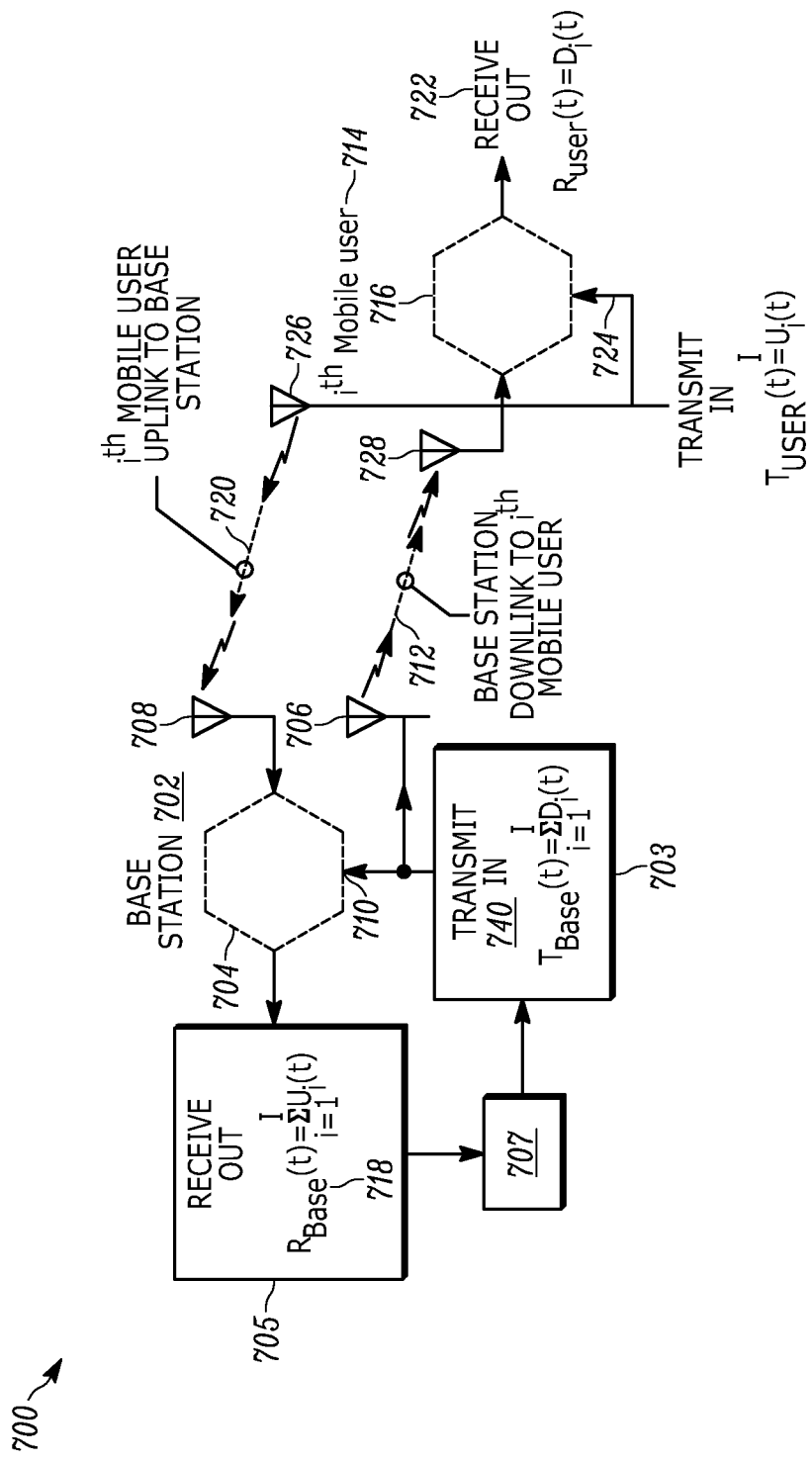
FIG. 7 illustrates an embodiment of a single-channel, full-time, full-duplex wireless transmission system in a mobile cellular communications configuration with a two-antenna base station and a two-antenna mobile user according to the present teaching.

FIG. 7 illustrates an embodiment of a two-antenna, single-channel, full-time, full-duplex wireless transmission system 700 in a mobile cellular communications configuration of the present teaching. A base station 702 includes a communication processor 704 that implements a system and method for removing a residual transmit signal from a receive signal, such as the STAR systems described in U.S. patent application Ser. No. 14/417,122, entitled "Same-Aperture Any-Frequency Simultaneous Transmit and Receive Communication System", which is incorporated herein by reference, or as described in connection with FIGS. 4A-D and FIG. 5. The communication processor 704 allows two signals at a same frequency and a same time and that are sufficiently uncorrelated to be sent through one to a transmit antenna 706 and the other to a receive antenna 708.

A receive processor 705 receives a receive signal from the communication processor 704. The receive processor connects to a channel state information processor 707 and determines channel state information of wireless channel associated with uplink 720. A transmit processor 703 generates a transmit signal. The transmit signal may be modified based on information from the channel state information processor 707. The high power transmit signal is sent directly to the transmit antenna 706, with a portion of the transmit signal being tapped off to port 710 of the communication processor 704. This portion of the transmit signal serves as the reference for the subtraction of the residual transmit signal in the receive path as described in conjunction with FIGS. 4A-D and FIG. 5. As was pointed out in conjunction with FIG. 6, the STAR system communication processors 704, 714, which are at the base station and mobile user, respectively, enable the same frequency channel to be used to convey both wireless channels 712 and 720. With the two channels being conveyed on the same frequency, this means that in a radical departure from conventional FDD, no frequency selective hardware—such as filters, duplexers, etc.—can be used to separate the uplink wireless channel 720 from the downlink wireless channel 712. Conversely, since there is no frequency selective hardware in communication processor 704 and communication processor 714, this means the embodiment shown in FIG. 7 is also not constrained to operate in STAR mode—it can equally well operate in conventional FDD mode.

Referring to both the single-channel, full-time, full-duplex wireless transmission system embodiments of FIG. 6 and FIG. 7, the signal on downlink 610, 712 to each mobile user 612, 714 could be sent via its own STAR communication processor 604, 704 or alternatively one could combine multiple downlink signals at a point in the transmit path prior to the communication processor 604, 704 and feed the combined signal to a single communication processor 604, 704. In the latter case, the transmit signal provided in the transmit paths that pass ports 608, 710 is given by:

$$T_{Base}(t) = \sum_{i=1}^{I} D_i(t).$$

The number of users, I, that can be combined depends on practical considerations such as the bandwidth of the resulting aggregate signal and the amount of transmit suppression needed.

The signal 616, 718 received at the output of the base station 602, 702 communication processor 604, 704, $R_{Base}(t)$, is the signal on uplink 618, 720, $U_i(t)$, from the mobile users 612, 714, $$R_{Base}(t) = U_i(t).$$

For the one antenna configuration of FIG. 6, the communication processor 604 is connected to the common antenna 606. The communication processor 604 suppresses the residual transmit signal using a portion of the transmit signal as was described in conjunction with any of FIGS. 4A-D. For the two antenna case of FIG. 7, the receive signal comes to the base station 702 receive antenna 708, whose output is fed to the communication processor 704 where the residual transmit signal is suppressed using the transmit reference that was tapped off the transmit signal as was discussed in conjunction with FIG. 5. The uplink signal from each mobile user could be received via its own communication processor 604, 704, or alternately one could separate multiple uplink signals at a point in the receive path after the communication processor 604, 704, which is the case shown in FIG. 6 and FIG. 7:

$$R_{Base}(t) = \sum_{i=1}^{I} U_i(t).$$

At the mobile user 612, 714, the receive signal 620, 722 at the output of the communication processor 614, 716, $R_{User}(t)$, is the signal on the downlink 610, 712 from the base station, $$R_{User}(t) = D_i(t).$$

The transmit signal at inputs 622, 724 to the communication processor 614, 716, $T_{User}(t)$, is the signal for uplink 618, 720 from the $i^{th}$ mobile user 612, 714 to the base station 602, 702, $$T_{User}(t) = U_i(t)$$

As was the case at the base station 602 the high power transmit signal at the mobile user 612 passes through the communication processor 614 in the single antenna 624 case in the embodiment of FIG. 6. For the embodiment of FIG. 7, the high power transmit signal at the mobile user 714 passes directly to the transmit antenna 726 in the two antenna case, with a portion going to the processor 716. The receive signal comes from the receive antenna 728 for the two antenna case shown in FIG. 7. The receive signal comes from the antenna 624 in the one antenna case of FIG. 6. Note that as indicated earlier, the two antenna configuration described in connection with FIG. 7 can also be supported by the communication processors described in connection with FIGS. 4B-D as well as the communication processor described in connection with FIG. 5.

One feature of embodiments of cellular systems described in FIGS. 6 and 7 that use STAR technology is that the frequency bands of the frequency channels can be the same band or can be different bands. That is, the uplink can use any frequency band, and the downlink can have any frequency band. In general, these systems are capable of operating with transmit and receive signals in any frequency band. So, the frequency channels for transmit and receive can be the same frequency channel, or can be different frequency channels. This ability to operate at the same or different frequency channels does not require any change to the STAR front end system. That is, the same front end can operate with the transmit and receive on the same frequency channel or on different frequency channels. This is because there are nominally no frequency limitations within the front end hardware, such as filters and/or diplexers that are used in prior art systems.

A potential advantage of the one antenna implementation of SCFTD (FIG. 6) as compared to the two antenna implementation of SCFTD (FIG. 7) is that it may be more practical to achieve higher degree of channel reciprocity with the one antenna implementation. It is important to keep in mind that channel reciprocity is just that: reciprocity of the signal while it is an electromagnetic wave propagating through space, i.e. on the field side of the antenna. However, the only access we have to the signal is on the circuit side of the antenna. Fortunately the circuit side of the antenna is fixed in the sense that the signal is no longer subject to variations in the multipath environment. Hence it is reasonable to achieve reciprocity between the circuit sides of the transmit and receive paths via calibration. A question remains as to whether the antenna can be included within the calibration. If the two antennas in the two-antenna implementation are physically separated by a sufficient distance, as may be the case as shown in FIG. 3, then the antennas will actually be transmitting and receiving their respective signals from two different locations, which may make it more challenging to establish a high degree of reciprocity. In this case the one-antenna implementation would be preferred. If the two antennas are antenna elements within the same antenna array, then the distance between the two antennas may be sufficiently small that a high degree of reciprocity can be achieved and the two-antenna implementation may be acceptable.

Figure 8:
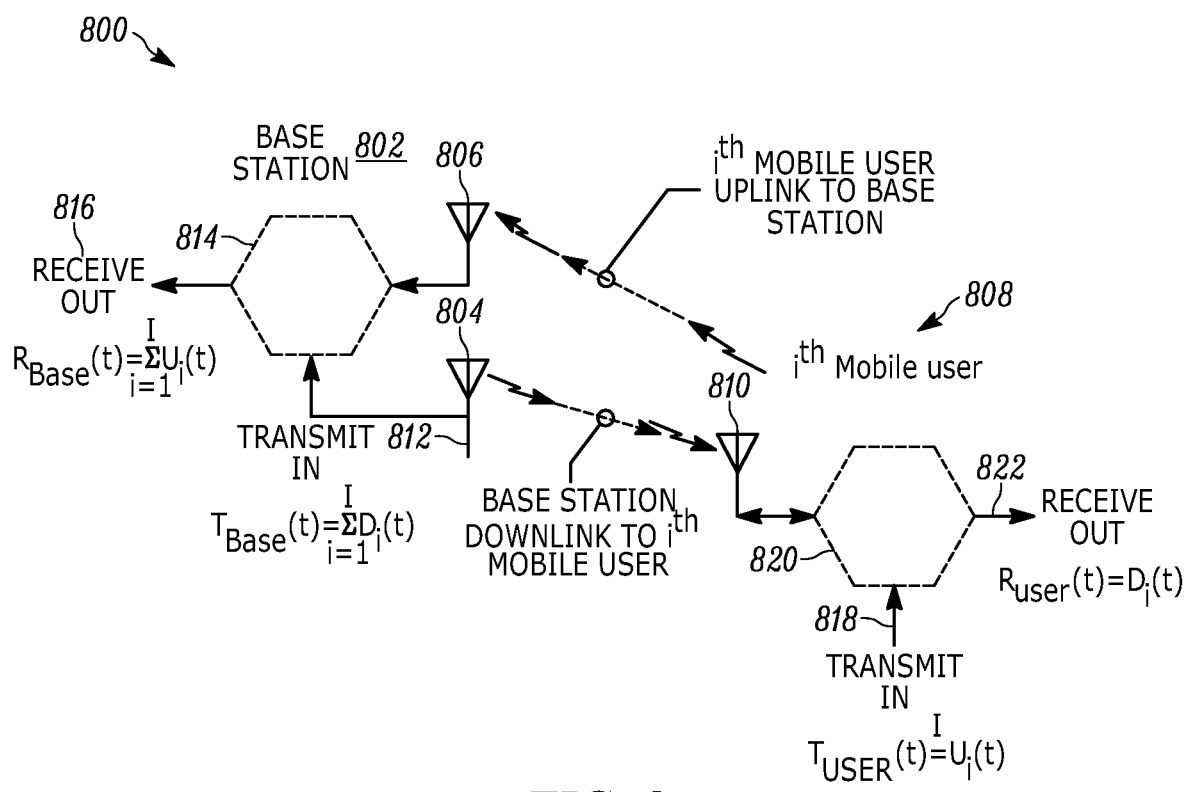
FIG. 8 illustrates an embodiment of a single-channel, full-time, full-duplex, wireless transmission system in a mobile cellular communications configuration with a two-antenna base station and a single antenna mobile user according to the present teaching.

FIG. 8 illustrates an embodiment of a single-channel full-time full-duplex wireless transmission system 800 in a mobile cellular communications configuration with a two-antenna base station and a single antenna mobile user of the present teaching. The base station 802 operates with a transmit antenna 804 and a receive antenna 806. The mobile users 808 use a single antenna 810 for both transmit and receive. This configuration may be considered a hybrid of the systems described in connection with FIGS. 6-7. The base station 802 high power transmit signal 812 is sent directly to the transmit antenna 804, with a portion of the transmit signal 812 being tapped off and sent to the communication processor 814. This portion of the transmit signal serves as the reference for the subtraction of the residual transmit signal in the receive path as described in conjunction with FIGS. 4B-D and 5. The receive signal 816 is received by the receive antenna 806 at the base station 802 and transmits to the processor 814 where the residual transmit signal is suppressed using the transmit reference that was tapped off the transmit signal 812.

The mobile user 808 operates as described in conjunction with FIG. 6. The high power transmit signal 818 passes through the communication processor 820 to the common transmit/receive antenna 810. The mobile user receive signal 822 as picked up by the common transmit/receive antenna 810 passes through the communication processor 820. The residual transmit signal in the receive path is suppressed by the communication processor 820 using a portion of the transmit signal.

In the three embodiments described in connection with FIGS. 6-8, the same frequency is being used for both the up- and down-links, without the use of time division multiplexing. That is, the up and down link signals operate continuously and simultaneously. Hence using SCFTD means that only one band of channel frequencies is required, as compared to the two bands of channel frequencies that are needed when using FDD, one band for the uplinks and one band for the downlinks. In some embodiments, because it can operate on a single frequency band per combination of up and down links, SCFTD can operate using bands of unpaired spectrum. One feature of the systems and methods of the present teaching using STAR technology is that these bands can be the same or different bands, and the operation is the same. That is, the uplink can use any frequency band, and the downlink can have any frequency band. These systems are capable of operating with transmit and receive signals in any frequency band. So, the frequency channels for transmit and receive can be the same frequency channel, or they can be different frequency channels. This ability to operate at the same or different frequency channels does not require any change to the STAR front end system. That is, the same front end can operate with the transmit and receive on the same frequency channel or on different frequency channels. This is because there are nominally no frequency limitations within the front end hardware, such as filters and/or diplexers that are used in prior art systems.

Further since in embodiments in which the same frequency is used for both up- and down-links, the channel state characteristics will be the same via reciprocity for the coherence time. Thus, SCFTD can support spatial multiplexing techniques that require channel state information, such as massive MIMO. In massive MIMO, the uplink pilot signal also simultaneously occupies the same frequency channel at the same time as the downlinks. For this reason, the CSI is the same for up and downlinks owing to reciprocity. This improves the MIMO operation. In some embodiments, additional suppression of the transmit signal may be provided using digital signal processing.

One feature of the single-channel, full-time full-duplex wireless signal transmission system of the present teaching is that the uplink pilot signal is sent simultaneously with the information on the downlink signal. As such, the CSI necessary for massive MIMO operation is a nominally a more accurate replica of the channel characteristics. This makes the MIMO system more effective and efficient. Note that the description refers to uplinks and downlinks as examples of wireless channels, however, it is clear to those skilled in the art that the system operates in a reciprocal and bi-directional way. As such, uplink and downlink can be reversed, as can wireless transmit and receive channels, while preserving the features of the system. Furthermore, the SCFTD system can be placed at one or both ends of a wireless link. In all these cases, a pilot signal used for massive MIMO is sent simultaneously and on the same physical path and on the same frequency with the information signals being transmitted in the other direction for embodiments that utilize massive MIMO antennas.

Equivalents

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A wireless single-frequency-channel, full-duplex, full-time transmit and receive communication node comprising:
   a) an antenna that transmits a transmit signal over a wireless transmit channel and that receives a receive signal over a wireless receive channel;
   b) a communications processor comprising:
      i) a first port electrically coupled to the antenna;
      ii) a second port electrically coupled to a transmit path, the transmit path connecting the second port to the first port; and
      iii) a third port electrically coupled to a receive path, the receive path connecting the first port to the third port,
      wherein the communications processor is configured to pass the transmit signal in the transmit path to the first port and is configured to pass the receive signal in the receive path from the first port to the third port such that the transmit signal and the receive signal occupy a same frequency channel and operate simultaneously in a same time slot; and
   c) a channel state information processor electrically coupled to the receive path, the channel state information processor calculating up-link channel state information based on the receive signal such that channel state information is measured and processed to determine the up-link channel state information in a time slot, while the transmit signal and the receive signal occupy the same frequency channel and operate simultaneously in the same time slot.

2. The wireless single-frequency-channel, full-duplex, full-time transmit and receive communication node of claim 1, wherein the channel state information processor is electrically coupled to the transmit path, the channel state information processor modifying the transmit signal based on the calculated up-link channel state information.

3. The wireless single-frequency-channel, full-duplex, full-time transmit and receive communication node of claim 1, wherein the antenna comprises a multi-element antenna.

4. The wireless single-frequency-channel, full-duplex, full-time transmit and receive communication node of claim 1, wherein the antenna comprises a multiple input multiple output (MIMO) antenna.

5. The wireless single-frequency-channel, full-duplex, full-time transmit and receive communication node of claim 1, wherein the same time slot comprises a cellular communication system time slot.

6. The wireless single-frequency-channel, full-duplex, full-time transmit and receive communication node of claim 1, wherein the same frequency channel comprises a cellular communication system frequency channel.

7. The wireless single-frequency-channel, full-duplex, full-time transmit and receive communication node of claim 1, wherein the same time slot comprises a 4G LTE system time slot.

8. The wireless single-frequency-channel, full-duplex, full-time transmit and receive communication node of claim 1, wherein the same frequency channel comprises a 4G LTE system frequency channel.

9. The wireless single-frequency-channel, full-duplex, full-time transmit and receive communication node of claim 1, wherein the same time slot comprises a 5G system time slot.

10. The wireless single-frequency-channel, full-duplex, full-time transmit and receive communication node of claim 1, wherein the same frequency channel comprises a 5G system frequency channel.

11. The wireless single-frequency-channel, full-duplex, full-time transmit and receive communication node of claim 1, wherein the same time slot comprises a WiFi system time slot.

12. The wireless single-frequency-channel, full-duplex, full-time transmit and receive communication node of claim 1, wherein the same frequency channel comprises a WiFi system frequency channel.

13. The wireless single-frequency-channel, full-duplex, full-time transmit and receive communication node of claim 1, wherein the same time slot comprises a satellite system time slot.

14. The wireless single-frequency-channel, full-duplex, full-time transmit and receive communication node of claim 1, wherein the same frequency channel comprises a satellite system frequency channel.

15. The wireless single-frequency-channel, full-duplex, full-time transmit and receive communication node of claim 1, wherein the communications processor further comprises a non-reciprocal waveguide comprising a first input connected to the first port, a second input connected to the second port, and an output connected to the third port.

16. The wireless single-frequency-channel, full-duplex, full-time transmit and receive communication node of claim 1, wherein the communications processor further comprises a fast switch comprising a first input connected to the first port, a second input connected to the second port, and an output connected to the third port.

17. The wireless single-frequency-channel, full-duplex, full-time transmit and receive communication node of claim 1, wherein the antenna comprises a base station antenna.

18. The wireless single-frequency-channel, full-duplex, full-time transmit and receive communication node of claim 1, wherein the antenna comprises a mobile user antenna.

19. The wireless single-frequency-channel, full-duplex, full-time transmit and receive communication node of claim 1, wherein the channel state information used in the slot is channel state information from an immediately adjacent previous slot.

20. A method of wireless single-frequency channel, full-duplex, full-time transmitting and receiving comprising:
   a) sending a transmit signal over a wireless transmit channel with an antenna;
   b) receiving a receive signal over a wireless receive channel with the antenna;
   c) connecting a first port electrically coupled to the antenna to a transmit path;
   d) connecting the first port electrically coupled to the antenna to a receive path;
   e) passing the transmit signal in the transmit path to the first port;
   f) passing the receive signal in the receive path from the first port to a third port, wherein the transmit signal and the receive signal occupy a same frequency channel and operate simultaneously in a same time slot; and
   g) calculating up-link channel state information based on the receive signal such that channel state information is measured and processed to determine the up-link channel state information in a time slot, while the transmit signal and the receive signal occupy the same frequency channel and operate simultaneously in the same time slot.

21. The method of wireless single-frequency channel, full-duplex, full-time transmitting and receiving of claim 20, further comprising modifying the transmit signal based on the calculated up-link channel state information.

22. The method of wireless single-frequency channel, full-duplex, full-time transmitting and receiving of claim 20, wherein the receiving the receive signal over the wireless receive channel with the antenna comprises receiving the receive signal over the wireless receive channel with a multi-element antenna.

23. The method of wireless single-frequency channel, full-duplex, full-time transmitting and receiving of claim 20, wherein the receiving the receive signal over the wireless receive channel with the antenna comprises receiving the receive signal over the wireless receive channel with a multiple input multiple output (MIMO) antenna.

24. The method of wireless single-frequency channel, full-duplex, full-time transmitting and receiving of claim 20, wherein the receiving the receive signal over the wireless receive channel with the antenna comprises receiving the receive signal over the wireless receive channel with an antenna base station.

25. The method of wireless single-frequency channel, full-duplex, full-time transmitting and receiving of claim 20, wherein the receiving the receive signal over the wireless receive channel with the antenna comprises receiving the receive signal over the wireless receive channel with a mobile user antenna.

26. The method of wireless single-frequency channel, full-duplex, full-time transmitting and receiving of claim 20, wherein the same time slot comprises a cellular communication system time slot.

27. The method of wireless single-frequency channel, full-duplex, full-time transmitting and receiving of claim 20, wherein the same time frequency channel comprises a cellular communication system frequency channel.

28. The method of wireless single-frequency channel, full-duplex, full-time transmitting and receiving of claim 20, wherein the same time slot comprises a 4G LTE system time slot.

29. The method of wireless single-frequency channel, full-duplex, full-time transmitting and receiving of claim 20, wherein the same frequency channel comprises a 4G LTE system frequency channel.

30. The method of wireless single-frequency channel, full-duplex, full-time transmitting and receiving of claim 19, wherein the same time slot comprises a 5G system time slot.

31. The method of wireless single-frequency channel, full-duplex, full-time transmitting and receiving of claim 20, wherein the same frequency channel comprises a 5G system frequency channel.

32. The method of wireless single-frequency channel, full-duplex, full-time transmitting and receiving of claim 20, wherein the same time slot comprises a WiFi system time slot.

33. The method of wireless single-frequency channel, full-duplex, full-time transmitting and receiving of claim 20, wherein the same frequency channel comprises a WiFi system frequency channel.

34. The method of wireless single-frequency channel, full-duplex, full-time transmitting and receiving of claim 20, wherein the same time slot comprises a satellite system time slot.

35. The method of wireless single-frequency channel, full-duplex, full-time transmitting and receiving of claim 20, wherein the same frequency channel comprises a satellite system frequency channel.

\* \* \* \* \*